US012639625B2

(12) United States Patent
Kobayashi et al.

(10) Patent No.: US 12,639,625 B2
(45) Date of Patent: May 26, 2026

(54) BIAS ADJUSTMENT DEVICE, INFORMATION PROCESSING DEVICE, INFORMATION PROCESSING METHOD, AND INFORMATION PROCESSING PROGRAM

(71) Applicant: Sony Group Corporation, Tokyo (JP)

(72) Inventors: Yoshiyuki Kobayashi, Tokyo (JP); Andrew Shin, Tokyo (JP); Akio Hayakawa, Tokyo (JP); Takayoshi Takayanagi, Tokyo (JP); Hirotaka Suzuki, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 996 days.

(21) Appl. No.: 17/771,051

(22) PCT Filed: Oct. 16, 2020

(86) PCT No.: PCT/JP2020/039133
§ 371 (c)(1),
(2) Date: Apr. 22, 2022

(87) PCT Pub. No.: WO2021/085188
PCT Pub. Date: May 6, 2021

(65) Prior Publication Data
US 2022/0358313 A1      Nov. 10, 2022

(30) Foreign Application Priority Data
Oct. 29, 2019    (JP) ................................. 2019-196106

(51) Int. Cl.
*G06N 20/00*          (2019.01)

(52) U.S. Cl.
CPC ......... *G06N 20/00* (2019.01); *G06F 2218/12* (2023.01)

(58) Field of Classification Search
CPC .............. G06F 2218/12; G06F 18/217; G06F 18/2148; G06N 20/00; G06N 3/045
See application file for complete search history.

(56) References Cited

U.S. PATENT DOCUMENTS 10,402,691  B1 *  9/2019  Abdi Taghi Abad ........................
                                  G06F 18/2431
2017/0061329  A1 *  3/2017  Kobayashi ............. G06N 20/00
2019/0147371  A1 *  5/2019  Deo ........................ G06N 20/20
                                  706/12

FOREIGN PATENT DOCUMENTS

JP        2004-86896  A      3/2004
JP        2017-111733  A      6/2017
(Continued)

OTHER PUBLICATIONS

Peng, Kang, Zoran Obradovic, and Slobodan Vucetic. "Towards efficient learning of neural network ensembles from arbitrarily large datasets." ECAI. vol. 16. 2004. (Year: 2004).*

(Continued)

*Primary Examiner* — Vincent Gonzales
*Assistant Examiner* — Pedro J Morales
(74) *Attorney, Agent, or Firm* — XSENSUS LLP

(57)      ABSTRACT

A bias adjustment device uses an identification model developed by machine learning using training data, and includes a calculation unit that calculates first identification accuracy of the identification model trained on first training data and second identification accuracy of the identification model trained on second training data acquired by an adjustment of the number of pieces of data of the first training data, a prediction unit that predicts a change in identification accuracy with respect to the number of pieces of training data on the basis of the first identification accuracy and the second identification accuracy, and a control unit that adjusts the number of pieces of data used for the training or changes the (Continued)

identification model, on the basis of the predicted change in the identification accuracy, in such a manner that the predicted change in the identification accuracy becomes a predetermined target value.

20 Claims, 12 Drawing Sheets

(56)                          References Cited

FOREIGN PATENT DOCUMENTS

| | | | |
|---|---|---|---|
| JP | 2017-130196 | A | 7/2017 |
| JP | 2017-162209 | A | 9/2017 |
| JP | 2018010475 | A | 1/2018 |
| JP | 2018-190140 | A | 11/2018 |
| JP | 2019-527874 | A | 10/2019 |
| WO | WO-2018203470 | A1 * | 11/2017 ............. G06N 20/00 |

OTHER PUBLICATIONS

International Search Report and Written Opinion mailed on Dec. 15, 2020, received for PCT Application PCT/JP2020/039133, Filed on Oct. 16, 2020, 9 pages including English Translation.

* cited by examiner

141

| DATA SET ID | DATA ID | DATA | TARGET #1 (CATEGORY) | TARGET #2 (CATEGORY) | ... |
|---|---|---|---|---|---|
| DS1 | DID1 | DT1 | RACE A | MALE | ... |
| | DID2 | DT2 | RACE B | FEMALE | ... |
| | DID3 | DT3 | RACE C | FEMALE | ... |
| | DID4 | DT4 | RACE D | FEMALE | ... |
| | DID5 | DT5 | RACE B | MALE | ... |
| | DID6 | DT6 | RACE C | MALE | ... |
| | DID7 | DT7 | RACE A | FEMALE | ... |
| | DID8 | DT8 | RACE B | MALE | ... |
| | ... | ... | ... | ... | ... |
| ... | ... | ... | ... | ... | ... |

142

| MODEL ID | USE | MODEL DATA | ... |
|---|---|---|---|
| M1 | IDENTIFICATION MODEL (IMAGE RECOGNITION) | MDT1 | ... |
| ... | ... | ... | ... |

CH1

~13

TO ACHIEVE TARGET ACCURACY,
DATA IS REQUIRED

10 TIME MORE FOR RACE A,
10,000 TIME MORE FOR RACE C, AND
100 TIME MORE FOR RACE D.

1

TERMINAL DEVICE — 10

N

INFORMATION PROCESSING DEVICE — 100A

INFORMATION PROCESSING DEVICE — 100A

N

COMMUNI-CATION UNIT — 11

CONTROL UNIT — 15A

ACQUISITION UNIT — 151A

LEARNING UNIT — 152

CALCULATION UNIT — 153

PREDICTION UNIT — 154

GENERATION UNIT — 155

TRANSMISSION UNIT — 156A

STORAGE UNIT — 14

DATA INFORMATION STORAGE UNIT — 141

MODEL INFORMATION STORAGE UNIT — 142

ACCURACY INFORMATION STORAGE UNIT — 143

BIAS ADJUSTMENT DEVICE, INFORMATION PROCESSING DEVICE, INFORMATION PROCESSING METHOD, AND INFORMATION PROCESSING PROGRAM

CROSS-REFERENCE TO RELATED APPLICATIONS

The present application is based on PCT filing PCT/JP2020/039133, filed Oct. 16, 2020, which claims priority to JP 2019-196106, filed Oct. 29, 2019, the entire contents of each are incorporated herein by reference.

FIELD

The present disclosure relates to a bias adjustment device, an information processing device, an information processing method, and an information processing program.

BACKGROUND

Information processing using machine learning is utilized in various technical fields, and technique of training a model of a neural network or the like has been provided. For example, technique of training a recognizer (model) that recognizes a recognition target from data has been provided (see, for example, Patent Literature 1).

CITATION LIST

Patent Literature

Patent Literature 1: Japanese Patent Application Laid-open No. 2017-130196

SUMMARY

Technical Problem

According to conventional technology, accuracy of a target of recognition by a recognizer generated by training is measured.

However, the conventional technology does not always make it possible to appropriately execute processing related to training of a model by using the model trained on adjusted data. For example, the conventional technology merely measures the accuracy of the target of recognition by the recognizer. Thus, for example, it is difficult to generate information indicating a relationship between the accuracy of the model and the data, or to enable training of a desired model by adjusting the data. Thus, it is desired to make it possible to appropriately execute the processing related to the training of the model by using the model trained on the adjusted data.

Thus, the present disclosure proposes a bias adjustment device, an information processing device, an information processing method, and an information processing program capable of making it possible to appropriately execute the processing related to training of the model by using the model trained on the adjusted data.

Solution to Problem

According to the present disclosure, a bias adjustment device for an identification model by machine learning using training data includes a calculation unit that calculates first identification accuracy of the identification model trained on first training data and second identification accuracy of the identification model trained on second training data acquired by an adjustment of number of pieces of data of the first training data; a prediction unit that predicts a change in identification accuracy with respect to the number of pieces of the training data on a basis of the first identification accuracy and the second identification accuracy; and a control unit that adjusts the number of pieces of data used for the training or changes the identification model, on a basis of the predicted change in the identification accuracy, in such a manner that the predicted change in the identification accuracy becomes a predetermined target value.

DESCRIPTION OF EMBODIMENTS

In the following, embodiments of the present disclosure will be described in detail on the basis of the drawings. Note that these embodiments do not limit a bias adjustment device, an information processing device, an information processing method, and an information processing program according to the present application. Also, in each of the following embodiments, overlapped description is omitted by assignment of the same reference sign to identical parts.

The present disclosure will be described in the following order of items.

1. Embodiment
1-1. Outline of Information Processing According to the Embodiment of the Present Disclosure
1-1-1. Effects and Assumptions of the Information Processing
1-1-2. Accuracy Example and a Plurality of Kinds of Accuracy
1-2. Configuration of an Information Processing Device According to the Embodiment
1-2-1. Model Example
1-3. Procedure of the Information Processing According to the Embodiment
1-4. Display Example
1-5. Target Accuracy (Target Value)
1-5-1. Relationship between the Target Accuracy (Target Value) and the Number of Pieces of Data
1-5-2. Display Example Related to the Target Accuracy (Target Value)
1-6. Conceptual Diagram of Processing by an Information Processing System
2. Other Embodiments
2-1. Modification Examples
2-2. Other Configuration Examples
2-3. Others
3. Effects According to the Present Disclosure
4. Hardware Configuration

1. Embodiment

Figure 1:
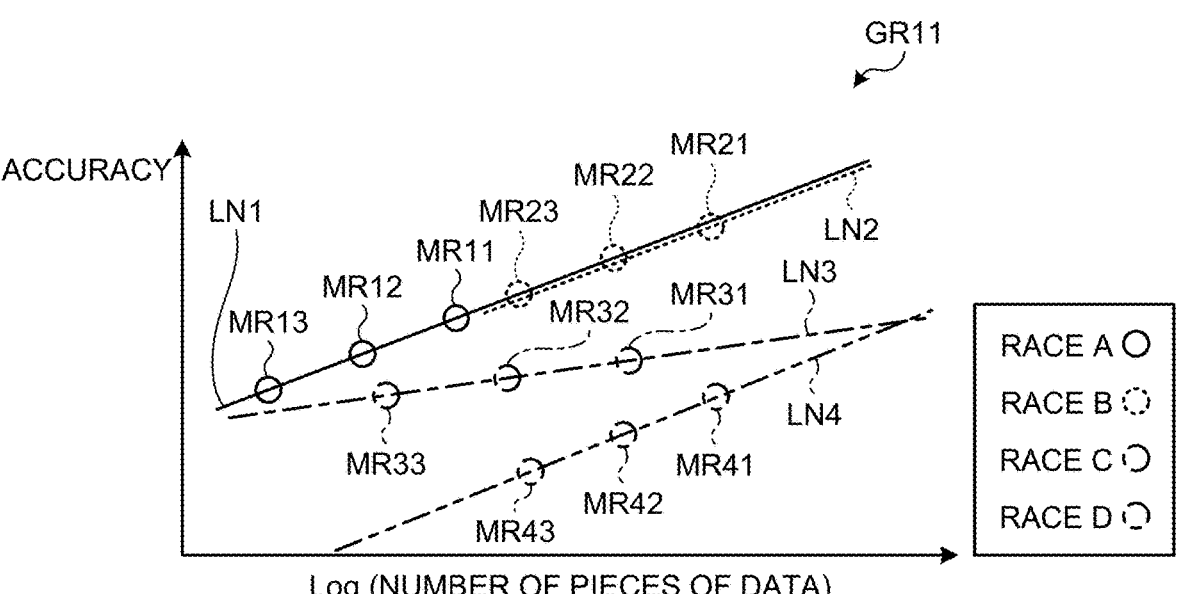
FIG. 1 is a view illustrating an example of information processing according to an embodiment of the present disclosure.
Figure 2:
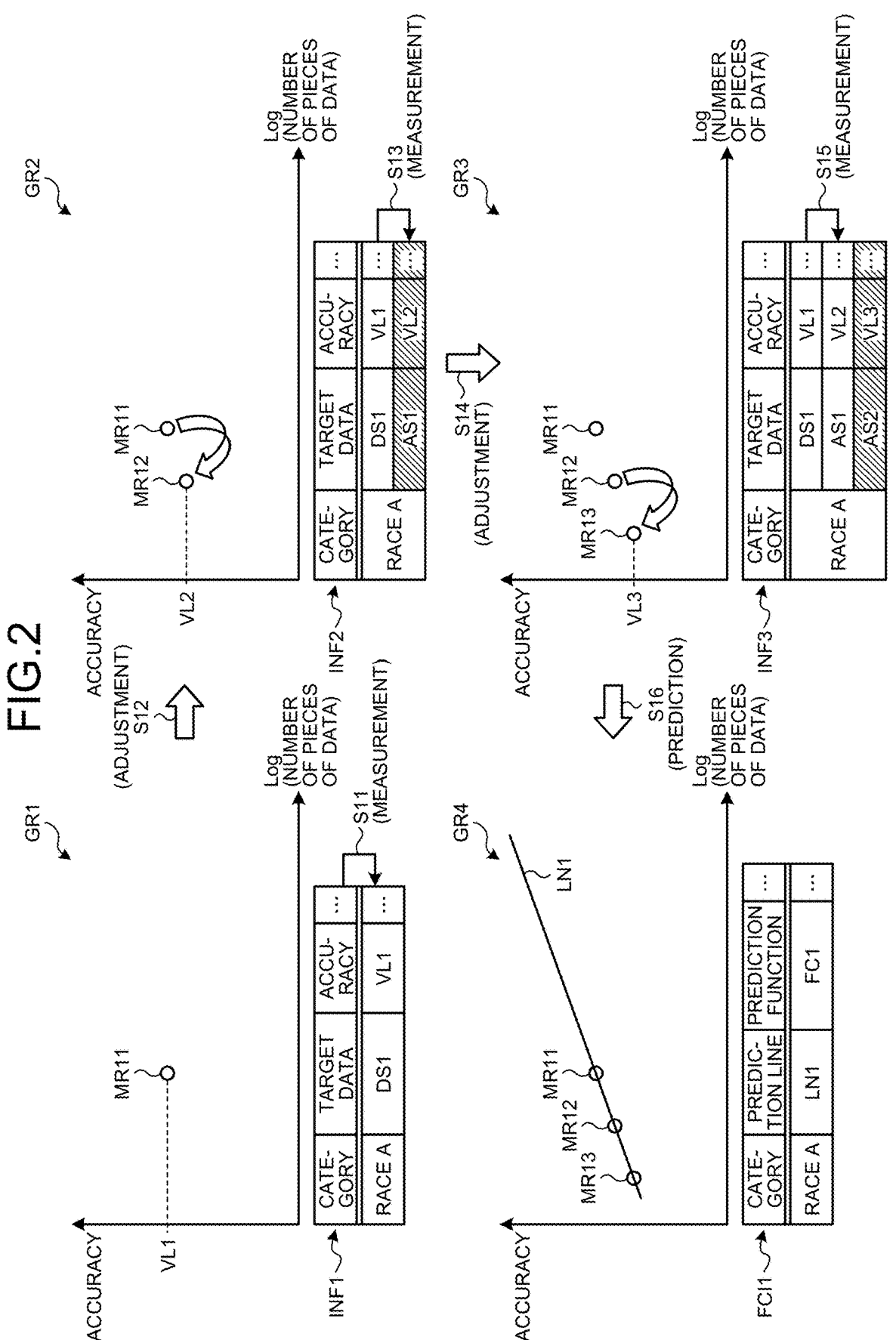
FIG. 2 is a view illustrating an example of the information processing according to the embodiment of the present disclosure.
Figure 3:
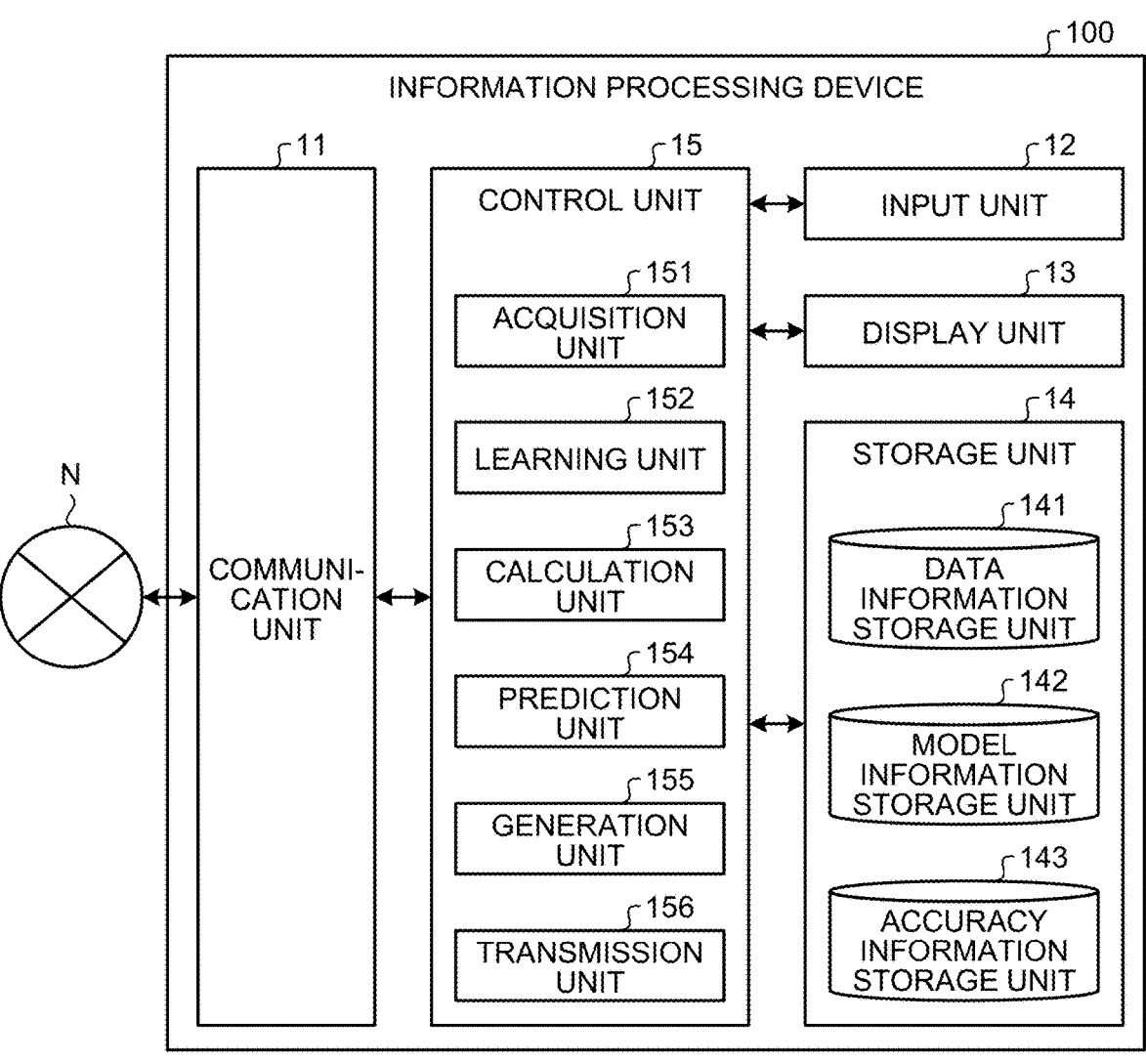
FIG. 3 is a view illustrating a configuration example of an information processing device according to the embodiment of the present disclosure.

1-1. Outline of Information Processing According to the Embodiment of the Present Disclosure FIG. 1 and FIG. 2 are views illustrating an example of the information processing according to the embodiment of the present disclosure. Specifically, FIG. 1 is a view illustrating an example of information processing in which four categories are targets. FIG. 2 is a view illustrating an example of a procedure of information processing in which one category is a target. The information processing according to the embodiment of the present disclosure is realized by an information processing device 100 illustrated in FIG. 3. The information processing device 100 illustrated in FIG. 3 is an example of a bias adjustment device.

The information processing device 100 is an information processing device that executes the information processing according to the embodiment. For example, the information processing device 100 is a bias adjustment device that executes bias adjustment processing according to the embodiment. Note that the bias adjustment processing by the information processing device 100 will be described in detail in FIG. 10. The information processing device 100 trains an identification model (hereinafter, also simply referred to as "model") while adjusting the number of pieces of data used for the training (number of pieces of data), and generates accuracy information related to identification accuracy (hereinafter, also simply referred to as "accuracy") of the trained model. The information processing device 100 adjusts the number of pieces of data of training data according to a target of the adjustment of the number of pieces of data. For example, the training data is at least data related to race, gender, an address, income, or an educational background. In the following, there is a case where a model trained on the training data before the adjustment of the number of pieces of data is referred to as a "first model" and a model trained on data acquired by the adjustment of the number of pieces of data of the training data (hereinafter, also referred to as "adjusted data") is referred to as a "second model". In the following, there is a case where the training data before the adjustment is described as "first training data" and the training data after the adjustment (adjusted data) is described as "second training data". Also, there is a case where identification accuracy of the model trained on the first training data (identification model) is described as "first identification accuracy" and identification accuracy of the model trained on the second training data (identification model) is described as "second identification accuracy". In the examples of FIG. 1 and FIG. 2, a case where the information processing device 100 trains the first model by using the training data (hereinafter, also referred to as "data set") and trains the second model by using the adjusted data acquired by a reduction of the number of pieces of data from the data set according to a target will be described as an example. Note that FIG. 1 and FIG. 2 are examples. The adjustment of the number of pieces of data is not limited to the reduction of the number of pieces of data, and may be any kind of adjustment such as increasing the number of pieces of data as long as desired accuracy information can be generated.

Also, in the examples of FIG. 1 and FIG. 2, processing of a case where the information processing device 100 targets race and where four categories that classifies the race and that are a "race A", "race B", "race C", and "race D" are examples will be described. Note that FIG. 1 and FIG. 2 are examples, and the race may be classified into five or more categories. Also, the target is not limited to the race, and may be any target such as gender, age, or a region. For example, in a case where the target is gender, classification into categories such as a "male" and a "female" is performed. The target may be anything as long as being classified into two or more categories.

Figure 4:
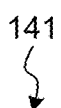
FIG. 4 is a view illustrating an example of a data information storage unit according to the embodiment of the present disclosure.

In the example of FIG. 1, the information processing device 100 trains a model used for image recognition by using a data set DS1 stored in a data information storage unit 141 (see FIG. 4). The data set DS1 includes many pairs of data to be an input of the model and an output of the model which output is expected when the data is input (hereinafter, also referred to as "correct answer information"). For example, the data set DS1 includes a plurality of pieces of data such as data DT1 to DT8, and correct answer information corresponding to each piece of data. Note that the data set DS1 may include data that does not correspond to any of the four categories of the "race A", "race B", "race C", and "race D".

Figure 5:
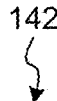
FIG. 5 is a view illustrating an example of a model information storage unit according to the embodiment of the present disclosure.

In the example of FIG. 1, the information processing device 100 designs a structure of a network (such as neural network) corresponding to a model M1 stored in a model information storage unit 142 (see FIG. 5). The information processing device 100 designs the structure of the network (network structure) of the model M1 used for the image recognition. For example, the information processing device 100 may generate the structure of the network of the model M1 used for the image recognition on the basis of information that is related to the structure of the network corresponding to each use and that is previously stored in a storage unit 14 (see FIG. 3). For example, the information processing device 100 may acquire structure information of the network of the model M1 used for the image recognition from an external device.

The data set DS1 includes pairs of a plurality of images and an output expected as a recognition result of each image (correct answer information). For example, the data set DS1 includes a pair of data DT1, which is an image in which a male of the race A is imaged, and correct answer information corresponding to the data DT1. Also, for example, the data set DS1 includes a pair of data DT2, which is an image in which a female of the race B is imaged, and correct answer information corresponding to the data DT2. Note that the correct answer information of the data DT1, DT2, and the like is not limited to the categories themselves such as the "race A" and "race B", and may be any correct answer information (correct answer label) as long as being a recognition result of an event, object, or the like included in the image. For example, the data DT1 is an image in which a person of the "race A" is imaged, and the correct answer information may be correct answer information (correct answer label) different from the "race A", such as a "graduation ceremony".

The information processing device 100 trains the designed neural network on the prepared data set. The information processing device 100 trains the network of the model M1 by using the data set DS1. For example, the information processing device 100 trains a parameter such as weight of the network of the model M1 by using the data set DS1. The information processing device 100 trains the parameter of the network of the model M1 and generates the first model and the second model corresponding to the model M1. For example, the first model and the second model are models having similar network structures and having different parameters such as the weight. For example, the first model and the second model corresponding to the model M1 are models having the network structure of the model M1 and having different parameters such as the weight.

Also, the information processing device 100 measures performance (also referred to as "accuracy") of the generated first model and second model by using predetermined evaluation data. For example, the information processing device 100 measures the accuracy (accuracy index) of the first model and the second model by using the evaluation data prepared separately from the training data. For example, the information processing device 100 evaluates the first model and the second model with separate fixed evaluation data different from the training data. On the basis of the accuracy of the first model trained on the data set (also referred to as "first accuracy") and the accuracy of the second model trained on the adjusted data (also referred to as "second accuracy"), the information processing device 100 generates accuracy information indicating accuracy of the model. The accuracy referred to here may be various indexes. Although the accuracy will be described below as an example, details of the accuracy will be described later.

The information processing device 100 measures the accuracy of the model with respect to each category by using the evaluation data corresponding to each category. For example, the information processing device 100 uses evaluation data corresponding to the category "race A" (also referred to as "race A evaluation data") for the measurement of the accuracy corresponding to the category "race A". The race A evaluation data includes many pairs of data corresponding to the category "race A" and correct answer information of the data. Also, the information processing device 100 uses evaluation data corresponding to the category "race B" (also referred to as "race B evaluation data") for the measurement of the accuracy corresponding to the category "race B". The race B evaluation data includes many pairs of data corresponding to the category "race B" and correct answer information of the data.

Also, the information processing device 100 uses evaluation data corresponding to the category "race C" (also referred to as "race C evaluation data") for the measurement of the accuracy corresponding to the category "race C". The race C evaluation data includes many pairs of data corresponding to the category "race C" and correct answer information of the data. Also, the information processing device 100 uses evaluation data corresponding to the category "race D" (also referred to as "race D evaluation data") for the measurement of the accuracy corresponding to the category "race D". The race D evaluation data includes many pairs of data corresponding to the category "race D" and correct answer information of the data. Note that the above is an example. The evaluation data is not limited to the above, and may be any data as long as a desired accuracy evaluation (measurement) can be performed. For example, common evaluation data may be used.

By using a model and evaluation information corresponding to each category, the information processing device 100 generates accuracy information in a manner illustrated in a graph GR11. Measurement MR11 to MR13, which are circles indicated by solid lines, and a prediction line LN1 in the graph GR11 correspond to information indicating the accuracy of the model corresponding to the category "race A". Also, measurement MR21 to MR23, which are circles indicated by dotted lines, and a prediction line LN2 in the graph GR11 correspond to information indicating the accuracy of the model corresponding to the category "race B". Also, measurement MR31 to MR33, which are circles indicated by dashed-dotted lines, and a prediction line LN3 in the graph GR11 correspond to information indicating the accuracy of the model corresponding to the category "race C". Also, measurement MR41 to MR43, which are circles indicated by dashed-two dotted lines, and a prediction line LN4 in the graph GR11 correspond to information indicating the accuracy of the model corresponding to the category "race D". Note that the information processing device 100 may enable identification of information of each category by color. For example, the information processing device 100 may generate information indicating pieces of information, which correspond to the four categories that are the categories "race A", "race B", "race C", and "race D", in different colors such as blue, green, yellow, and red, respectively.

From here, processing with each category being a target will be specifically described on the basis of processing which is illustrated in FIG. 2 and in which the category "race A" is a target. First, with the data set DS1 as a target, the information processing device 100 trains the first model of the model M1 used for the image recognition. A position on a horizontal axis "log (number of pieces of data)" which position corresponds to a measurement MR11 in a graph GR1 indicates the number of pieces of data (current number of pieces of data) that corresponds to the category "race A" and that is used for the training at that time. It is indicated that the data set DS1 includes the data of the category "race A", the number of pieces of data corresponding to the position on the horizontal axis "log (number of pieces of data)" which position corresponds to the measurement MR11. Note that the horizontal axis of the graph is not limited to the logarithm (log), and may be various scales (scales).

Then, the information processing device 100 measures the accuracy corresponding to the category "race A" with respect to the trained first model (Step S11). The information processing device 100 measures the accuracy corresponding to the category "race A" with respect to the first model by using the race A evaluation data. The information processing device 100 acquires a measurement result in a manner indicated by the measurement MR11 in the graph GR1. As illustrated in measurement accuracy information INF1 and the graph GR1, the information processing device 100 measures the accuracy corresponding to the category "race A" as "VL1" with respect to the first model. That is, in a case of the model trained by utilization of the entire data set DS1 (first model), the information processing device 100 measures the accuracy corresponding to the category "race A" as "VL1". Note that it is assumed that the accuracy is a specific numerical value although the accuracy is indicated by abstract signs such as "VL1" and "VL2" in the following.

Then, the information processing device 100 adjusts the number of pieces of data (Step S12). The information processing device 100 reduces the number of pieces of data corresponding to the category "race A" in the data set DS1. For example, the information processing device 100 reduces the number of pieces of data that corresponds to the category "race A" and that is included in the data set DS1 by half (50%). Note that the half is not a limitation and the information processing device 100 may adjust the number of pieces of data on the basis of various criteria. For example, the information processing device 100 may perform the reduction by 10%. In a case where the number of pieces of data that corresponds to the category "race A" and that is included in the data set DS1 is "10000", the information processing device 100 reduces the number of pieces of data corresponding to the category "race A" to "5000". For example, the information processing device 100 randomly selects data corresponding to the category "race A" and reduces the number of pieces of data corresponding to the category "race A". As a result, the information processing device 100 generates an adjusted data set AS1 in which the number of pieces of data is adjusted.

Then, with the adjusted data set AS1 as a target, the information processing device 100 trains the second model of the model M1 used for the image recognition. With the adjusted data set AS1 in which the data corresponding to the category "race A" is reduced from the data set DS1 being the target, the information processing device 100 trains the second model of the model M1 used for the image recognition.

Then, the information processing device 100 measures the accuracy corresponding to the category "race A" with respect to the trained second model (Step S13). The information processing device 100 measures the accuracy corresponding to the category "race A" with respect to the second model by using the race A evaluation data. The information processing device 100 acquires a measurement result in a manner indicated by a measurement MR12 in a graph GR2. As illustrated in measurement accuracy information INF2 and the graph GR2, the information processing device 100 measures the accuracy corresponding to the category "race A" as "VL2" with respect to the second model. That is, in a case of the model trained by utilization of the adjusted data set AS1 (second model), the information processing device 100 measures the accuracy corresponding to the category "race A" as "VL2".

Then, the information processing device 100 adjusts the number of pieces of data (Step S14). For example, the information processing device 100 adjusts the number of pieces of data until a predetermined condition is satisfied. For example, the information processing device 100 performs the reduction until the number of pieces of data becomes smaller than a predetermined threshold. For example, in a case where the number of pieces of data of a target category becomes smaller than the predetermined threshold, the information processing device 100 ends the measurement processing targeting the category. Note that the above is not a limitation, and the information processing device 100 may end the measurement processing on the basis of various conditions. For example, in a case where a measurement (plot) sufficient to draw a prediction line (described later) is performed, the information processing device 100 may end the measurement processing targeting the category.

In the example of FIG. 2, the information processing device 100 reduces the number of pieces of data corresponding to the category "race A" in the adjusted data set AS1. For example, the information processing device 100 reduces the number of pieces of data that corresponds to the category "race A" and that is included in the adjusted data set AS1 by half. The information processing device 100 reduces the number of pieces of data corresponding to the category "race A" to "2500" in a case where the number of pieces of data that corresponds to the category "race A" and that is included in the adjusted data set AS1 is "5000". As a result, the information processing device 100 generates an adjusted data set AS2 in which the number of pieces of data is further adjusted from the adjusted data set AS1.

Then, the information processing device 100 trains the second model of the model M1 used for the image recognition with the adjusted data set AS2 as a target. Note that the second model trained on the adjusted data set AS2 will also be referred to as a "third model" in the description in a distinction from the second model trained on the adjusted data set AS1. With the adjusted data set AS2 in which the data corresponding to the category "race A" is further reduced from the adjusted data set AS1 being the target, the information processing device 100 trains the third model of the model M1 used for the image recognition.

Then, the information processing device 100 measures the accuracy corresponding to the category "race A" with respect to the trained third model (Step S15). The information processing device 100 measures the accuracy corresponding to the category "race A" with respect to the third model by using the race A evaluation data. The information processing device 100 acquires a measurement result in a manner indicated by a measurement MR13 in a graph GR3. As illustrated in measurement accuracy information INF3 and the graph GR3, the information processing device 100 measures the accuracy corresponding to the category "race A" as "VL3" with respect to the third model. That is, in a case of the model trained by utilization of the adjusted data set AS2 (third model), the information processing device 100 measures the accuracy corresponding to the category "race A" as "VL3". In the example of FIG. 2, the information processing device 100 determines that the predetermined condition is satisfied, adjusts the number of pieces of data, and ends the processing of measuring the accuracy of the trained model. For example, the information processing device 100 determines that the predetermined condition is satisfied, adjusts the number of pieces of data, and ends the processing of measuring the accuracy of the trained model.

Then, the information processing device 100 predicts an accuracy change in the model (Step S16). The information processing device 100 predicts the accuracy change in the model on the basis of the information indicated by the measurement MR11 to the measurement MR13. The information processing device 100 derives a function that predicts the accuracy of the model corresponding to the category "race A". As illustrated in prediction accuracy information FCI1, the information processing device 100 derives a function FC1 corresponding to the prediction line LN1 of the accuracy of the model corresponding to the category "race A". In such a manner, the information processing device 100 generates the prediction line LN1 indicating the prediction of the accuracy change in the model corresponding to the category "race A" of a case where the number of pieces of data of the training data is increased.

For example, as illustrated in a graph GR4, the information processing device 100 derives the function corresponding to the line passing through points corresponding to the measurement MR11 to the measurement MR13 (prediction line LN1). The information processing device 100 may generate the function FC1 corresponding to the prediction line LN1 by appropriately using various kinds of technique related to fitting. The information processing device 100 may generate the function FC1 corresponding to the prediction line LN1 by linear prediction or the like. For example, the information processing device 100 may derive the function FC1 corresponding to the prediction line LN1 by appropriately using various kinds of technique such as the least-squares method. Also, the information processing device 100 may derive the function FC1 corresponding to the prediction line LN1 by using technique related to machine learning. Note that the function FC1 derived by the information processing device 100 may be a linear function or a non-linear function.

In such a manner, from the acquired relationship between the number of pieces of data and the (accuracy) index, the information processing device 100 predicts an improvement range of the index of a case where the data is increased. Then, the information processing device 100 generates a graph for each of the evaluation result (measurement result) and prediction result with a horizontal axis being the number of pieces of data and a vertical axis being the (accuracy) index. For example, the information processing device 100 generates and displays the graph GR11 illustrated in FIG. 1. The information processing device 100 displays the prediction line LN1 of the accuracy of a case where the data corresponding to the category "race A" is increased.

By the above-described processing, the information processing device 100 generates the accuracy information corresponding to the category "race A". Specifically, as illustrated in the graph GR4, the information processing device 100 generates the accuracy information including the measured accuracy and the predicted accuracy with respect to the category "race A".

Returning to FIG. 1, the description is continued. The information processing device 100 generates accuracy information including measured accuracy and predicted accuracy with respect to the four categories in a manner illustrated in the graph GR11 by performing processing also for the other categories "race B", "race C", and "race D" in a manner similar to the processing targeting the category "race A" and illustrated in FIG. 2.

For example, the information processing device 100 also performs processing with respect to the category "race B" in a manner similar to the processing targeting the category "race A" and illustrated in FIG. 2. The information processing device 100 trains the first model of the model M1 used for the image recognition with the data set DS1 as a target. A position on a horizontal axis "log (number of pieces of data)" which position corresponds to the measurement MR21 in the graph GR11 indicates the number of pieces of data (current number of pieces of data) that corresponds to the category "race B" and that is used for the training at that time. It is indicated that the data set DS1 includes the data of the category "race B", the number of pieces of data corresponding to the position on the horizontal axis "log (number of pieces of data)" which position corresponds to the measurement MR21.

The information processing device 100 measures the accuracy corresponding to the category "race B" with respect to the first model by using race B evaluation data. The information processing device 100 acquires a measurement result in a manner indicated by the measurement MR21 in the graph GR11.

Then, the information processing device 100 reduces the number of pieces of data corresponding to the category "race B" in the data set DS1 and trains the second model. The information processing device 100 measures the accuracy corresponding to the category "race B" with respect to the second model by using the race B evaluation data. The information processing device 100 acquires a measurement result in a manner indicated by the measurement MR22 in the graph GR11. Then, the information processing device 100 further reduces the number of pieces of data corresponding to the category "race B" from that at a time point of the measurement of the measurement MR22 and trains the second model (third model). The information processing device 100 measures the accuracy corresponding to the category "race B" with respect to the third model by using the race B evaluation data. The information processing device 100 acquires a measurement result in a manner indicated by the measurement MR23 in the graph GR11.

Then, the information processing device 100 predicts the accuracy change in the model on the basis of the information indicated by the measurement MR21 to the measurement MR23. The information processing device 100 derives a prediction line LN2 that predicts the accuracy of the model corresponding to the category "race B".

Also, with the data set DS1 as the target, the information processing device 100 trains the first model of the model M1 used for the image recognition. A position on the horizontal axis "log (number of pieces of data)" which position corresponds to the measurement MR31 in the graph GR11 indicates the number of pieces of data (current number of pieces of data) that corresponds to the category "race C" and that is used for the training at that time. It is indicated that the data set DS1 includes the data of the category "race C", the number of pieces of data corresponding to the position on the horizontal axis "log (number of pieces of data)" which position corresponds to the measurement MR31.

The information processing device 100 measures the accuracy corresponding to the category "race C" with respect to the first model by using the race C evaluation data. The information processing device 100 acquires a measurement result in a manner indicated by the measurement MR31 in the graph GR11.

Then, the information processing device 100 reduces the number of pieces of data corresponding to the category "race C" in the data set DS1 and trains the second model. The information processing device 100 measures the accuracy corresponding to the category "race C" with respect to the second model by using the race C evaluation data. The information processing device 100 acquires a measurement result in a manner indicated by the measurement MR32 in the graph GR11. Then, the information processing device 100 further reduces the number of pieces of data corresponding to the category "race C" from that at a time point of the measurement of the measurement MR32 and trains the second model (third model). The information processing device 100 measures the accuracy corresponding to the category "race C" with respect to the third model by using the race C evaluation data. The information processing device 100 acquires a measurement result in a manner indicated by the measurement MR33 in the graph GR11.

Then, the information processing device 100 predicts the accuracy change in the model on the basis of the information indicated by the measurement MR31 to the measurement MR33. The information processing device 100 derives a prediction line LN3 that predicts the accuracy of the model corresponding to the category "race C".

Also, with the data set DS1 as the target, the information processing device 100 trains the first model of the model M1 used for the image recognition. Note that the information processing device 100 may use a common first model with respect to all the four categories. A position on the horizontal axis "log (number of pieces of data)" which position corresponds to the measurement MR41 in the graph GR11 indicates the number of pieces of data (current number of pieces of data) that corresponds to the category "race D" and that is used for the training at that time. It is indicated that the data set DS1 includes the data of the category "race D", the number of pieces of data corresponding to the position on the horizontal axis "log (number of pieces of data)" which position corresponds to the measurement MR41.

The information processing device 100 measures the accuracy corresponding to the category "race D" with respect to the first model by using the race D evaluation data. The information processing device 100 acquires a measurement result in a manner indicated by the measurement MR41 in the graph GR11.

Then, the information processing device 100 reduces the number of pieces of data corresponding to the category "race D" in the data set DS1 and trains the second model. The information processing device 100 measures the accuracy corresponding to the category "race D" with respect to the second model by using the race D evaluation data. The information processing device 100 acquires a measurement result in a manner indicated by the measurement MR42 in the graph GR11. Then, the information processing device 100 further reduces the number of pieces of data corresponding to the category "race D" from that at a time point of the measurement of the measurement MR42 and trains the second model (third model). The information processing device 100 measures the accuracy corresponding to the category "race D" with respect to the third model by using the race D evaluation data. The information processing device 100 acquires a measurement result in a manner indicated by the measurement MR43 in the graph GR11.

Then, the information processing device 100 predicts the accuracy change in the model on the basis of the information indicated by the measurement MR41 to the measurement MR43. The information processing device 100 derives a prediction line LN4 that predicts the accuracy of the model corresponding to the category "race D".

By the above-described processing, the information processing device 100 generates the graph GR11 indicating the accuracy of the model corresponding to each of the four categories that are the categories "race A", "race B", "race C", and "race D".

Then, the information processing device 100 displays the generated graph GR11. Note that the information processing device 100 may display accuracy information not only in a manner of the graph GR11 but also in various forms such as character information. Details of this point will be described later.

1-1-1. Effects and Assumptions of Information Processing

As described above, the information processing device 100 generates the accuracy information including the measurement result of the accuracy of the model and the prediction result of the accuracy of the model corresponding to each of the plurality of categories. Specifically, the information processing device 100 generates the accuracy information including the measurement result of the accuracy of the model and the prediction result of the accuracy of the model corresponding to each of the categories "race A", "race B", "race C", and "race D". As a result, the information processing device 100 can appropriately generate information related to the accuracy of the model by the adjustment of the data. In such a manner, the information processing device 100 can make it possible to appropriately execute the processing related to training of the model by using the model trained on the adjusted data. Note that the processing of adjusting the number of pieces of data for each category has been described as an example in the examples of FIG. 1 and FIG. 2. However, the information processing device 100 may perform processing after adjusting the number of pieces of entire data.

Then, the information processing device 100 displays the generated accuracy information. The information processing device 100 displays the generated graph GR11. As a result, the information processing device 100 can display information indicating how much data is to be increased to solve an accuracy difference in the categories. Thus, a user who visually recognizes the information displayed by the information processing device 100 can grasp how much data is to be increased thereafter in order to solve the accuracy difference in the categories, and can grasp in which category improvement of the accuracy is essentially difficult.

In the example of FIG. 1, the information processing device 100 can indicate a degree of difficulty in the accuracy improvement of the model with respect to each category by displaying the accuracy information of each of the categories "race A", "race B", "race C", and "race D". By a slope of the prediction line of each category, the information processing device 100 can indicate the degree of difficulty in the accuracy improvement of the model with respect to each category.

For example, as illustrated in the graph GR11, the slope of the prediction line of the category "race C" is small. Thus, the user can recognize that the category "race C" is a category in which the accuracy improvement is difficult. For example, in the model M1, it is indicated that bias (bias) is generated with respect to the category "race C" and improvement thereof is difficult.

As described above, accuracy of an issue in which a prediction line has a gentle slope is low even when the number of pieces of data is increased. Thus, such an issue can be regarded as an issue that has noisy data or that is essentially difficult. In the example of FIG. 1, for example, it is indicated that the accuracy of the race A can be improved to the same extent as the race B by an increase of the data. Also, it can be indicated that it is essentially difficult to improve the accuracy in the races C and D, and that the accuracy cannot be improved even when there is no intention of discrimination.

Here, as disclosed in the following literature and the like, as a characteristic of deep learning, it is assumed that performance is improved (in a sky-high manner) in proportion to a logarithm of the number of pieces of data.

Exploring the Limits of Weakly Supervised Pretraining, Dhruv Mahajan, Ross Girshick, Vignesh Ramanathan, Kaiming He, Manohar Paluri, Yixuan Li, Ashwin Bharambe, Laurens van der Maaten <https://arxiv.org/abs/1805.00932>

As illustrated in FIG. 1 and FIG. 2, the information processing device 100 derives a prediction line indicating that the performance (accuracy) is improved as the number of pieces of data is increased, and generates the accuracy information indicating the prediction of the accuracy change in the model of a case where the number of pieces of data of the training data is increased.

For example, there are ethical issues in artificial intelligence (AI)/deep learning. For example, there are issues with respect to fairness and bias. Such issues include falsely recognizing a specific person as a so-called ape such as a gorilla, failing to pass loan screening in a specific area, lacking image recognition performance in a specific race, and the like. As a background of such issues, a possibility that the AI makes discriminatory determination, there is a bias toward the specific area, or there is a bias toward the specific area is assumed.

Here, there is a case where both of a cultural issue and technical issue are mixed in the above-described issues. For example, as the cultural issue, a possibility that there is a cause, such as a possibility that training is performed to make discriminatory determination, a possibility that training is performed not to pass loan screening in a specific area, or an amount of training data being small discriminatorily only for a certain race is assumed. Also, for example, as the technical issue, a possibility that the data is likely to be misclassified essentially, a possibility that there is a reason why loan is difficult to pass in the area, or a possibility that it is physically difficult to recognize a specific race is assumed.

Thus, the information processing device 100 generates information that can be used to isolate whether an issue related to the accuracy of the model is an issue that can be managed by technique. For example, the information processing device 100 generates information that can provide a guideline indicating how much improvement can be expected in a case where the improvement is possible technically. For example, the information processing device 100 generates information that serves as a guideline indicating whether a bias is improved by an increase of an amount of data and how much the data is to be increased in that case, specifically. Then, the information processing device 100 displays the generated information. In the example of FIG. 1, by displaying the graph GR11, the information processing device 100 provides the user with the information that serves as the guideline for the above issues.

The above-described function is provided as a function of a tool (such as tool TL1 in FIG. 12) used by a developer of technique using machine learning, such as deep learning. By using the above-described function, the user can understand, in a development stage of the technique, how much bias is present, whether a problem can be solved technically, or how much effort is required for the solution.

Here, the developer who uses the technique of the deep learning often desires to easily analyze a bias and fairness of a trained model and to acquire a guideline for bias and fairness improvement. Also, the deep learning has an aspect of being a black box, and there is a problem that the bias and fairness cannot be visualized as it is in an easy-to-understand manner. Thus, the information processing device 100 generates information for visualizing the bias and fairness in an easy-to-understand manner.

As described above, the information processing device 100 performs training while changing the number of pieces of data for each target category (such as male/female, or race) a bias of which is to be improved. Then, the information processing device 100 generates information indicating how indexes such as the bias and fairness change in a case where the number of pieces of data of each changes. As a result, the information processing device 100 realizes the function of visualizing the bias and fairness in an easy-to-understand manner. For example, the information processing device 100 sets the number of pieces of data of the training data in each category on a horizontal axis and an index such as the bias on a vertical axis, and presents a predicted value indicating how the index is improved when the number of pieces of data in each category is increased thereafter.

For example, the information processing device 100 repeats training and evaluation while changing the number of pieces of data, evaluates an influence of the number of pieces of data on the bias and fairness, and predicts an improvement range of the indexes of a case where the number of pieces of data is increased. Also, the information processing device 100 displays a result acquired by the prediction. For example, the information processing device 100 performs a loop for each category, and performs training and calculation (measurement) of an (accuracy) index related to the bias or fairness for the designated number of times while reducing the data by half and half from the original number of pieces of data. Also, from an acquired relationship between the number of pieces of data and the indexes, the information processing device 100 predicts the improvement range of the indexes of a case where the data is increased thereafter. Also, the information processing device 100 displays a graph of each of the evaluation result and the prediction result with the number of pieces of data on the horizontal axis and the indexes on the vertical axis. As a result, the information processing device 100 can isolate the bias and fairness of the data from an essential difficulty level of an issue in an easy-to-understand manner. For example, the information processing device 100 can isolate, in an easy-to-understand manner, an essential cause of the issue, such as a lack of fairness due to presence of a physical factor from a cause such as the bias and fairness of the data.

1-1-2. Accuracy Example and Plurality of Kinds of Accuracy

As described above, accuracy is not limited to the accuracy and may be various indexes. For example, the accuracy may be various indexes such as recall, precision, and F-measure. Also, in a case where a model used for object detection or the like is a target, the accuracy may be object detection accuracy, an error in an object detection position, an error in an object detection size, or the like. For example, the information processing device 100 may determine an index to be used as the accuracy according to a use of the trained model.

Also, the information processing device 100 may generate accuracy information indicating a plurality of kinds of accuracy of the model corresponding to a plurality of indexes. For example, the information processing device 100 may generate the accuracy information indicating measurement results and prediction results of the model corresponding to the plurality of indexes. For example, the information processing device 100 may generate the accuracy information indicating measurement results and prediction results of the model corresponding to two indexes that are the "recall" and "precision". The information processing device 100 may display one kind of accuracy designated by the user among the plurality of kinds of accuracy.

Also, the information processing device 100 may display the plurality of kinds of accuracy in a switchable manner. For example, the information processing device 100 may display accuracy information corresponding to the "recall" in a case where the user designates the "recall" between the "recall" and the "precision". Also, the information processing device 100 may display accuracy information corresponding to the "precision" in a case where the user designates the "precision" between the "recall" and the "precision". Note that the above is an example, and the information processing device 100 may display a plurality of kinds of accuracy in various modes. For example, the information processing device 100 may display the plurality of kinds of accuracy at the same time.

There may be a plurality of accuracy indexes depending on application (use). Thus, as described above, by similarly generating a graph for each (accuracy) index, the information processing device 100 can perform switching and displaying according to the designation by the user.

1-2. Configuration of Information Processing Device According to the Embodiment Next, a configuration of the information processing device 100, which is an example of the information processing device that executes the information processing according to the embodiment, will be described. FIG. 3 is a view illustrating a configuration example of the information processing device 100 according to the embodiment of the present disclosure. For example, the information processing device 100 illustrated in FIG. 3 is an example of the bias adjustment device. The information processing device 100 is a computer that realizes a function as the bias adjustment device (described later).

As illustrated in FIG. 3, the information processing device 100 includes a communication unit 11, an input unit 12, a display unit 13, a storage unit 14, and a control unit 15. In the example of FIG. 3, the information processing device 100 includes the input unit 12 (such as keyboard or mouse) that receives various operations from an administrator of the information processing device 100, and the display unit 13 (such as liquid-crystal display) to display various kinds of information.

The communication unit 11 is realized, for example, by a network interface card (NIC), a communication circuit, or the like. The communication unit 11 is connected to a communication network N (such as the Internet) in a wired manner or wireless manner, and transmits/receives information to/from other devices via the communication network N (network N).

Various operations are input from the user to the input unit 12. The input unit 12 receives an input by the user. The input unit 12 may receive selection of a learning method which selection is performed by the user. The input unit 12 may receive various operations from the user via a keyboard, mouse, or touch panel provided in the information processing device 100. The input unit 12 receives an input of a target accuracy (target value) by the user. The input unit 12 receives designation of the target accuracy by the user. The input unit 12 receives designation of a numerical value of the target accuracy by the user. The input unit 12 receives designation of target accuracy TA1 illustrated in FIG. 10.

The display unit 13 displays various kinds of information. The display unit 13 is a display device (display unit) such as a display, and displays the various kinds of information. The display unit 13 displays information measured by a calculation unit 153. The display unit 13 displays information predicted by a prediction unit 154. The display unit 13 displays information generated by a generation unit 155.

The display unit 13 displays a predicted change in identification accuracy in a graph or text. The display unit 13 displays the accuracy information. The display unit 13 displays the accuracy information as characters. The display unit 13 displays the accuracy information as a numerical value. The display unit 13 displays the accuracy information as a diagram. The display unit 13 displays the accuracy information as a graph. The display unit 13 displays a graph in which the accuracy is on a first axis is and the number of pieces of data is on a second axis. The display unit 13 displays information indicating a relationship between the accuracy of the model and the target accuracy. The display unit 13 displays information indicating the relationship between the number of pieces of data in the accuracy of the model and the number of pieces of data in the target accuracy.

The display unit 13 displays a plurality of kinds of accuracy in a switchable manner. The display unit 13 displays one kind of accuracy among the plurality of kinds of accuracy. The display unit 13 displays one kind of accuracy designated by the user. The display unit 13 displays the graph GR11 illustrated in FIG. 1.

Also, the information processing device 100 may include not only the display unit 13 but also a functional configuration that outputs information. Note that the information processing device 100 may have a function of outputting the information as sound. For example, the information processing device 100 may include a sound output unit such as a speaker that outputs sound.

The storage unit 14 is realized by a semiconductor memory element such as a random access memory (RAM) or a flash memory, or a storage device such as a hard disk or an optical disk, for example. The storage unit 14 includes a data information storage unit 141, a model information storage unit 142, and an accuracy information storage unit 143. Although not illustrated, the accuracy information storage unit 143 stores various kinds of information related to the measured or predicted accuracy of the model. For example, the accuracy information storage unit 143 stores various kinds of information related to the target accuracy, such as a numerical value indicating the target accuracy TA1 illustrated in FIG. 10.

The data information storage unit 141 stores various kinds of information related to the data. FIG. 4 is a view illustrating an example of the data information storage unit according to the embodiment of the present disclosure. For example, the data information storage unit 141 stores various kinds of information related to various kinds of data such as training data used for training, and evaluation data used for accuracy evaluation (measurement). An example of the data information storage unit 141 according to the embodiment is illustrated in FIG. 4. In the example of FIG. 4, the data information storage unit 141 includes items such as a "data set ID", a "data ID", "data", a "target #1 (category)", and a "target #2 (category)". Note that not only the "target #1 (category)" and the "target #2 (category)" but also a "target #3 (category)", a "target #4 (category)", and the like may be included. The number of the "target #1" to "target #N" may be the number of targets of the accuracy evaluation. In the example of FIG. 4, only race and gender are illustrated. However, the training data stored in the data information storage unit 141 is at least data related to race, gender, an address, income, or educational background. The "target #3 (category)" in the data information storage unit 141 may be related to the address, the "target #4 (category)" may be related to the income, and the "target #5 (category)" may be related to the educational background.

The "data set ID" indicates identification information for identifying a data set. The "data ID" indicates identification information for identifying an object. Also, the "data" indicates data corresponding to an object identified by the data ID. That is, in the example of FIG. 4, vector data (data) corresponding to the object is registered in association with the data ID that identifies the object.

The "target #1 (category)" and the "target #2 (category)" indicate categories corresponding to targets of corresponding data. The "target #1 (category)" indicates a category of each piece of data related to the target "race". The "target #2 (category)" indicates a category of each piece of data related to the target "gender".

In the example of FIG. 4, it is indicated that a data set identified by a data set ID "DS1" (data set DS1) includes a plurality of pieces of data identified by data IDs "DID1", "DID2", "DID3", and the like. Each piece of data (training data) identified by the data ID "DID1", "DID2", "DID3" or the like includes at least information related to race, gender, an address, income, or educational background.

Data DT1 identified by the data ID "DID1" indicates that the category related to the target "race" is the "race A" and the category related to the target "gender" is the "male". In this case, it is indicated that the data DT1 is data related to a person who is the race A and is a male. For example, the data DT1 may be an image in which a male of the race A is imaged.

Also, it is indicated that data DT2 identified by the data ID "DID2" indicates that the category related to the target "race" is the "race B" and the category related to the target "gender" is the "female". In this case, it is indicated that the data DT2 is data related to a person who is the race B and is a female. For example, the data DT1 may be an image in which a female of the race B is imaged.

Note that the data information storage unit 141 may store not only the above but also various kinds of information depending on a purpose. The data information storage unit 141 stores correct answer information (correct answer label) corresponding to each piece of data in association with each piece of data. Note that a target itself such as the "target #1 (category)" or the "target #2 (category)" may be used as the correct answer information.

Also, the data information storage unit 141 stores, in an identifiable manner, whether each piece of data is training data or evaluation data. For example, the data information storage unit 141 stores the training data and the evaluation data in a distinguishable manner. The data information storage unit 141 may store information that identifies whether each piece of data is the training data or evaluation data. The information processing device 100 trains the model on the basis of each piece of data, which is used as the training data, and the correct answer information. The information processing device 100 measures the accuracy of the model on the basis of each piece of data, which is used as the evaluation data, and the correct answer information. The information processing device 100 measures the accuracy of the model by collecting a result of a comparison between an output result, which is output by the model in a case where the evaluation data is input, and the correct answer information.

The model information storage unit 142 according to the embodiment stores information related to the model. For example, the model information storage unit 142 stores information indicating a structure of the model (network) (model data). FIG. 5 is a view illustrating an example of the model information storage unit according to the embodiment of the present disclosure. An example of the model information storage unit 142 according to the embodiment is illustrated in FIG. 5. In the example illustrated in FIG. 5, the model information storage unit 142 includes items such as a "model ID", a "use", and "model data".

The "model ID" indicates identification information for identifying the model. The "use" indicates a use of the corresponding model. The "model data" indicates data of the model. The example in which conceptual information such as "MDT1" is stored in the "model data" is illustrated in FIG. 5. However, in reality, various kinds of information included in the model, such as information and a function related to a network included in the model are included.

In the example illustrated in FIG. 5, it is indicated that a use of a model identified by a model ID "M1" (model M1) is an "identification model (image recognition)". It is indicated that the model M1 is the identification model and is used for the image recognition. Also, it is indicated that model data of the model M1 is model data MDT1.

Note that the model information storage unit 142 may store not only the above but also various kinds of information depending on a purpose. For example, the model information storage unit 142 stores information of a first model and a second model trained (generated) in learning processing. The model information storage unit 142 stores parameter information of the first model and the second model corresponding to the model M1 trained (generated) in the learning processing.

Returning to FIG. 3, the description is continued. The control unit 15 is realized, for example, when a program (such as information processing program according to the present disclosure) stored in the information processing device 100 is executed by a central processing unit (CPU), a micro processing unit (MPU), or the like with a random access memory (RAM) or the like as a work area. Also, the control unit 15 is a controller, and may be realized by an integrated circuit such as an application specific integrated circuit (ASIC) or a field programmable gate array (FPGA), for example.

As illustrated in FIG. 3, the control unit 15 includes an acquisition unit 151, a learning unit 152, the calculation unit 153, the prediction unit 154, the generation unit 155, and a transmission unit 156, and realizes or executes functions or actions of the information processing described in the following. Note that an internal configuration of the control unit 15 is not limited to the configuration illustrated in FIG. 3, and may be another configuration as long as being a configuration of performing information processing described later.

The acquisition unit 151 acquires various kinds of information. The acquisition unit 151 acquires various kinds of information from an external information processing device. The acquisition unit 151 acquires various kinds of information from the storage unit 14. The acquisition unit 151 acquires information received by the input unit 12.

The acquisition unit 151 acquires various kinds of information from the storage unit 14. The acquisition unit 151 acquires various kinds of information from the data information storage unit 141, the model information storage unit 142, and the accuracy information storage unit 143.

The acquisition unit 151 acquires the training data. The acquisition unit 151 acquires the data set DS1 from the data information storage unit 141. The acquisition unit 151 acquires the evaluation data. The acquisition unit 151 acquires the evaluation data from the data information storage unit 141. The acquisition unit 151 acquires the race A evaluation data, the race B evaluation data, the race C evaluation data, and the race D evaluation data from the data information storage unit 141.

The acquisition unit 151 may acquire the model. The acquisition unit 151 may acquire information indicating a network structure of the model. The acquisition unit 151 acquires the model from the external information processing device or the storage unit 14 that provides the model. For example, the acquisition unit 151 acquires the model M1 from the model information storage unit 142. For example, the acquisition unit 151 acquires information indicating a network structure of the model M1 from the model information storage unit 142.

The acquisition unit 151 acquires various kinds of information learned by the learning unit 152. The acquisition unit 151 acquires various kinds of information measured by the calculation unit 153. The acquisition unit 151 acquires various kinds of information predicted by the prediction unit 154. The acquisition unit 151 acquires various kinds of information generated by the generation unit 155.

The acquisition unit 151 acquires the training data used for the training of the model by machine learning. The acquisition unit 151 acquires training data including data corresponding to each of the plurality of categories. The acquisition unit 151 acquires target accuracy indicating a target of accuracy of the model. The acquisition unit 151 acquires the target accuracy received by the input unit 12. The acquisition unit 151 acquires designation information that designates one kind of accuracy.

The learning unit 152 performs the learning processing. The learning unit 152 performs various kinds of learning. The learning unit 152 learns various kinds of information on the basis of the information acquired by the acquisition unit 151. The learning unit 152 trains (generates) a model. The learning unit 152 learns various kinds of information of the model or the like. The learning unit 152 generates the model by the training. The learning unit 152 trains the model by using various kinds of technique related to the machine learning. For example, the learning unit 152 learns parameters of the model (network). The learning unit 152 trains the model by using various kinds of technique related to the machine learning.

The learning unit 152 performs various kinds of learning. The learning unit 152 learns various kinds of information on the basis of the information stored in the storage unit 14. The learning unit 152 trains the model on the basis of the information stored in the data information storage unit 141 and the model information storage unit 142.

The learning unit 152 learns parameters of the network. For example, the learning unit 152 learns parameters of a network of the model M1. The learning unit 152 trains the first model and the second model corresponding to the model M1 by learning the parameters of the network of the model M1.

The learning unit 152 generates the first model and the second model by performing the learning processing on the basis of the training data (teacher data) stored in the data information storage unit 141. The learning unit 152 generates the first model by performing the learning processing by using the training data stored in the data information storage unit 141. The learning unit 152 generates the second model by performing the learning processing by using data acquired by an adjustment of the training data stored in the data information storage unit 141. For example, the learning unit 152 generates the model used for the image recognition. The learning unit 152 learns the parameters of the network of the model M1 and generates the first model and the second model corresponding to the model M1. Also, the learning unit 152 may generate a first model and a second model having different network structures.

A method of the learning by the learning unit 152 is not specifically limited. For example, training data in which label information (such as race) and an image group are associated may be prepared, and the training data may be input into a calculation model based on a multi-layer neural network and learned. Also, for example, a method based on a deep neural network (DNN) such as a convolutional neural network (CNN) or 3D-CNN may be used. In a case where time-series data, for example, in a manner of a moving image (moving image) such as a video is a target, the learning unit 152 may use a method based on a recurrent neural network (RNN) or long short-term memory units (LSTM) in which the RNN is extended.

The learning unit 152 stores the first model and second model generated by the training into the model information storage unit 142. The learning unit 152 generates the first model, the second model, and the like corresponding to the network of the model M1. In this case, the learning unit 152 stores the generated first model, second model, and the like into the model information storage unit 142 in association with the model M1. The learning unit 152 trains the model on the basis of each piece of data used as the training data, and the correct answer information.

The learning unit 152 trains the first model on the training data. The learning unit 152 adjusts the number of pieces of data used for the training. The learning unit 152 trains the second model on the adjusted data in which the number of pieces of data of the training data is adjusted according to a target for which the number of pieces of data is adjusted. The learning unit 152 trains the second model on the adjusted data in which the number of pieces of data is reduced from the training data. The learning unit 152 reduces the number of pieces of data from the training data on the basis of a predetermined standard, and trains the second model on the adjusted data on which the adjustment is performed.

The learning unit 152 trains the second model on the adjusted data in which the number of pieces of data of the training data is adjusted according to a category indicating a classification related to the target. The learning unit 152 trains the second model on the adjusted data in which the number of pieces of data of the training data is adjusted according to one category among a plurality of categories of the target.

The learning unit 152 trains the second model on the adjusted data acquired by an adjustment of the number of pieces of data corresponding to the one category in the training data. The learning unit 152 trains the second model on the adjusted data acquired by a reduction of the number of pieces of data corresponding to the one category in the training data. The learning unit 152 trains the second model on each of a plurality of pieces of the adjusted data in which the number of pieces of data of the training data is adjusted for each of the plurality of categories.

In the examples of FIG. 1 and FIG. 2, with the data set DS1 as the target, the learning unit 152 trains the first model of the model M1 used for the image recognition. The learning unit 152 trains, with the adjusted data set AS1 as the target, the second model of the model M1 used for the image recognition. With the adjusted data set AS1 in which the data corresponding to the category "race A" is reduced from the data set DS1 being the target, the learning unit 152 trains the second model (third model) of the model M1 used for the image recognition. The learning unit 152 trains, with the adjusted data set AS2 as the target, the second model of the model M1 used for the image recognition. With the adjusted data set AS2 in which the data corresponding to the category "race A" is further reduced from the adjusted data set AS1 being the target, the learning unit 152 trains the third model of the model M1 used for the image recognition.

The calculation unit 153 performs calculation processing. The calculation unit 153 performs processing of calculating various kinds of information. The calculation unit 153 calculates first identification accuracy of the identification model trained on the first training data. The calculation unit 153 calculates second identification accuracy of the identification model trained on the second training data in which the number of pieces of data is adjusted with respect to the first training data. The calculation unit 153 functions as a measurement unit that performs the measurement processing. The calculation unit 153 performs various kinds of measurement. The calculation unit 153 measures various kinds of information on the basis of the information acquired by the acquisition unit 151. The calculation unit 153 measures various kinds of information on the basis of the information stored in the storage unit 14. The calculation unit 153 measures various kinds of information on the basis of the information stored in the data information storage unit 141, the model information storage unit 142, and the accuracy information storage unit 143. The calculation unit 153 makes various kinds of determination. The calculation unit 153 determines various kinds of information on the basis of the information acquired by the acquisition unit 151. The calculation unit 153 determines various kinds of information on the basis of the information stored in the storage unit 14.

The calculation unit 153 measures the accuracy of the model by using the evaluation data. The calculation unit 153 measures the accuracy of the first model and the second model. The calculation unit 153 stores information related to the measured accuracy of the model into the accuracy information storage unit 143. The calculation unit 153 measures the accuracy of the model on the basis of each piece of data, which is used as the evaluation data, and the correct answer information. The calculation unit 153 measures the accuracy of the model by collecting a comparison result between an output result, which is output by the model in a case where the evaluation data is input, and the correct answer information.

The calculation unit 153 measures the first accuracy of the first model by using the evaluation data. The calculation unit 153 measures the second accuracy of the second model by using the evaluation data. The calculation unit 153 measures the first accuracy of the first model by using evaluation data corresponding to one category. The calculation unit 153 measures the second accuracy of the second model by using evaluation data corresponding to the one category. The calculation unit 153 measures a plurality of pieces of the first accuracy of the first model by using the evaluation data corresponding to each of the plurality of categories. The calculation unit 153 measures a plurality of pieces of the second accuracy corresponding to each of the plurality of categories.

In the examples of FIG. 1 and FIG. 2, the calculation unit 153 measures the accuracy corresponding to the category "race A" with respect to the trained first model. The calculation unit 153 measures the accuracy corresponding to the category "race A" by using the race A evaluation data. The calculation unit 153 measures the accuracy corresponding to the category "race A" as "VL1" with respect to the first model. The calculation unit 153 measures the accuracy corresponding to the category "race A" as "VL2" with respect to the second model. The calculation unit 153 measures the accuracy corresponding to the category "race A" as "VL3" with respect to the third model.

The prediction unit 154 performs prediction processing. The prediction unit 154 predicts various kinds of information. The prediction unit 154 predicts various kinds of information on the basis of the information acquired from the external information processing device. The prediction unit 154 predicts various kinds of information on the basis of the information stored in a storage unit 134. The prediction unit 154 predicts various kinds of information on the basis of the information stored in the data information storage unit 141, the model information storage unit 142, and the accuracy information storage unit 143. The prediction unit determines a change in the accuracy information with respect to the number of pieces of training data on the basis of the first identification accuracy of the identification model trained on the first training data and the second identification accuracy of the identification model trained on the second training data.

The prediction unit 154 predicts the accuracy of the first model and the second model. The prediction unit 154 stores information related to the predicted accuracy of the model into the accuracy information storage unit 143. The prediction unit 154 predicts the accuracy of the model on the basis of a measurement result from the calculation unit 153. The prediction unit 154 predicts a prediction line on the basis of the measurement result from the calculation unit 153.

The prediction unit 154 predicts an accuracy change in the model of a case where the number of pieces of data is adjusted according to the target on the basis of the first accuracy and the second accuracy. The prediction unit 154 predicts the accuracy change in the model of a case where the number of pieces of data of the training data is increased. The prediction unit 154 predicts the prediction line of the accuracy of the model of a case where the number of pieces of data of the training data is increased.

In the examples of FIG. 1 and FIG. 2, the prediction unit 154 predicts the accuracy change in the model on the basis of the information indicated by the measurement MR11 to the measurement MR13. The prediction unit 154 derives a function that predicts the accuracy of the model corresponding to the category "race A". The prediction unit 154 derives the function FC1 corresponding to the prediction line LN1 of the accuracy of the model corresponding to the category "race A".

The generation unit 155 functions as a control unit that performs various kinds of control related to a bias adjustment. The generation unit 155 functions as a bias adjustment control unit that performs bias adjustment processing. On the basis of the change in the identification accuracy predicted by the prediction unit 154, the generation unit 155 adjusts the number of pieces of data used for the training in such a manner that the predicted change in the identification accuracy becomes a predetermined target value (target accuracy). Also, the generation unit 155 changes the identification model on the basis of the change in the identification accuracy predicted by the prediction unit 154. The generation unit 155 changes the identification model in a case where it is difficult to achieve the target accuracy by adjusting the number of pieces of data used for the training. The generation unit 155 changes the identification model in a case where an increase in the number of pieces of data required to achieve the target accuracy is equal to or larger than a predetermined threshold. For example, the generation unit 155 changes the identification model by changing the network structure of the model. For example, the generation unit 155 changes the identification model by changing the depth (number) of layers or the number of nodes (corresponding to circles in FIG. 6) of the model. The generation unit 155 performs various kinds of generation. The generation unit 155 generates various kinds of information on the basis of the information acquired by the acquisition unit 151. The generation unit 155 generates various kinds of information on the basis of the information stored in the storage unit 14. The generation unit 155 generates various kinds of information on the basis of the information stored in the data information storage unit 141, the model information storage unit 142, and the accuracy information storage unit 143.

The generation unit 155 generates various kinds of information to be displayed on the display unit 13. The generation unit 155 generates various kinds of information such as character information, and image information such as a graph to be displayed on the display unit 13.

Note that the generation unit 155 generates information (image) related to the screen, such as the graph GR11 illustrated in FIG. 1 by appropriately using various conventional technologies related to the image. The generation unit 155 generates the image such as the graph GR11 illustrated in FIG. 1 by appropriately using various conventional technologies related to a GUI. For example, the generation unit 155 may generate the image such as the graph GR11 in CSS, JavaScript (registered trademark), HTML, or arbitrary language capable of describing the above-described information processing such as information displaying and operation reception.

On the basis of the first accuracy of the first model, which is a model trained on the training data, and the second accuracy of the second model that is a model trained on the adjusted data in which the number of pieces of data of the training data is adjusted according to the target for which the number of pieces of data is adjusted, the generation unit 155 generates the accuracy information indicating the accuracy of the model. The generation unit 155 generates the accuracy information on the basis of the second model trained on the adjusted data in which the number of pieces of data is reduced from the training data. On the basis of the first accuracy and the second accuracy, the generation unit 155 generates the accuracy information indicating an accuracy change in the model due to the adjustment of the number of pieces of data according to the target.

The generation unit 155 generates the accuracy information on the basis of the first accuracy of the first model which accuracy is measured by utilization of the evaluation data and the second accuracy of the second model which accuracy is measured by utilization of the evaluation data. On the basis of the first accuracy and the second accuracy, the generation unit 155 generates the accuracy information indicating a prediction of the accuracy change in the model of a case where the number of pieces of data is adjusted according to the target. The generation unit 155 generates the accuracy information indicating the prediction of the accuracy change in the model of a case where the number of pieces of data of the training data is increased. The generation unit 155 generates the accuracy information including a prediction line of the accuracy of the model of a case where the number of pieces of data of the training data is increased.

On the basis of the second accuracy of the second model trained on the adjusted data in which the number of pieces of data of the training data is adjusted according to a category indicating a classification related to the target, the generation unit 155 generates the accuracy information related to the category. On the basis of the second accuracy of the second model trained on the adjusted data in which the number of pieces of data of the training data is adjusted according to one category of a plurality of the categories of the target, the generation unit 155 generates the accuracy information of the model which information indicates the accuracy of the model with respect to the one category. The generation unit 155 generates the accuracy information on the basis of the second accuracy of the second model trained on the adjusted data in which the number of pieces of data corresponding to the one category in the training data is adjusted.

The generation unit 155 generates the accuracy information on the basis of the second accuracy of the second model trained on the adjusted data in which the number of pieces of data corresponding to the one category in the training data is reduced. The generation unit 155 generates the accuracy information on the basis of the first accuracy of the first model with respect to the one category and the second accuracy of the second model with respect to the one category.

The generation unit 155 generates the accuracy information on the basis of the first accuracy of the first model which accuracy is measured by utilization of the evaluation data corresponding to the one category and the second accuracy of the second model which accuracy is measured by utilization of the evaluation data corresponding to the one category. The generation unit 155 generates the accuracy information indicating the accuracy of the model with respect to each of the plurality of categories on the basis of a plurality of pieces of the second accuracy of a plurality of the second models respectively trained on a plurality of pieces of the adjusted data in which the number of pieces of data of the training data is adjusted for each of the plurality of categories.

The generation unit 155 generates the accuracy information on the basis of a plurality of pieces of the first accuracy of the first model corresponding to each of the plurality of categories and the plurality of pieces of second accuracy of the plurality of second models respectively corresponding to the plurality of categories. The generation unit 155 generates the accuracy information on the basis of the plurality of pieces of first accuracy of the first model, which accuracy is measured by utilization of the evaluation data corresponding to each of the plurality of categories, and the plurality of pieces of second accuracy respectively corresponding to the plurality of categories.

On the basis of the plurality of pieces of first accuracy respectively corresponding to the plurality of categories and the plurality of pieces of second accuracy respectively corresponding to the plurality of categories, the generation unit 155 generates the accuracy information indicating a relationship between the plurality of categories with respect to the accuracy of the model. The generation unit 155 generates the accuracy information indicating a bias in the accuracy of the model in the plurality of categories. The generation unit 155 generates the accuracy information indicating a degree of difficulty in accuracy improvement of each model in the plurality of categories. The generation unit 155 generates the accuracy information indicating a plurality of kinds of accuracy of the model respectively corresponding to a plurality of indexes.

In the example of FIG. 1, by performing processing with each of the categories "race A", "race B", "race C", and "race D" as the target, the generation unit 155 generates the accuracy information that includes measured accuracy and predicted accuracy with respect to the four categories and that is in a manner illustrated in the graph GR11.

The transmission unit 156 transmits various kinds of information. The transmission unit 156 provides various kinds of information. The transmission unit 156 provides various kinds of information to the external information processing device. The transmission unit 156 transmits various kinds of information to the external information processing device. The transmission unit 156 transmits the information stored in the storage unit 14. The transmission unit 156 transmits the information stored in the data information storage unit 141, the model information storage unit 142, and the accuracy information storage unit 143. The transmission unit 156 transmits the information generated by the generation unit 155.

1-2-1. Model Example

As described above, the information processing device 100 may use various forms of models (functions). For example, the information processing device 100 may use a model (function) of an arbitrary form which model is, for example, a regression model such as a support vector machine (SVM), or a neural network. The information processing device 100 may use various regression models, such as a non-linear regression model and a linear regression model.

Figure 6:
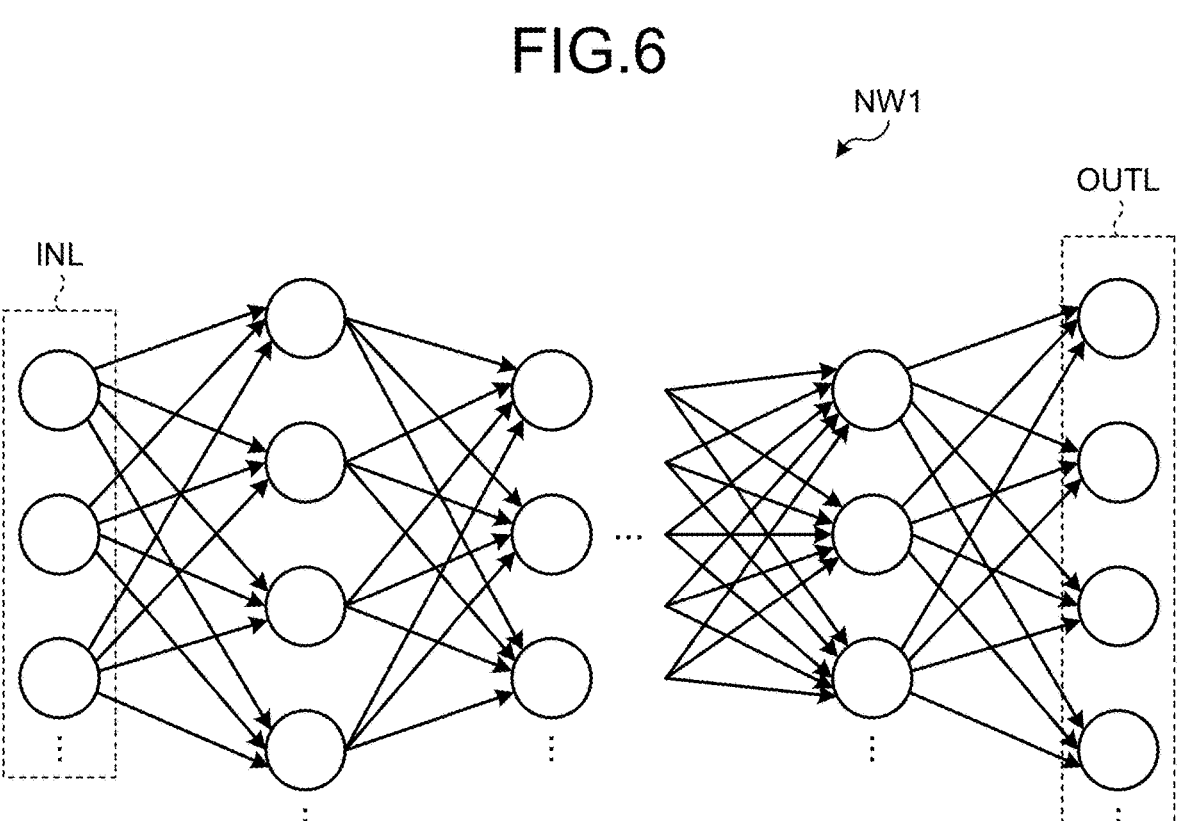
FIG. 6 is a view illustrating an example of a model according to the embodiment of the present disclosure.

Regarding this point, an example of the network structure of the model will be described with reference to FIG. 6. FIG. 6 is a view illustrating an example of the model according to the embodiment of the present disclosure. A network NW1 illustrated in FIG. 6 indicates a neural network including a plurality of (multi-layer) intermediate layers between an input layer INL and an output layer OUTL. For example, the information processing device 100 may learn parameters of the network NW1 illustrated in FIG. 6.

The network NW1 illustrated in FIG. 6 is a conceptual diagram indicating a neural network (model) corresponding to the network of the model M1 and used for the image recognition. For example, in a case where an image is input from a side of the input layer INL, the network NW1 outputs a recognition result thereof from the output layer OUTL. For example, by inputting information into the input layer INL in the network NW1, the information processing device 100 causes the output layer OUTL to output a recognition result corresponding to the input.

Note that the network NW1 may be in various forms depending on a use or the like although the network NW1 is illustrated as an example of the model (network) in FIG. 6. For example, the information processing device 100 trains the first model and the second model corresponding to the model M1 by learning the parameters (weight) of the model M1 having the structure of the network NW1 illustrated in FIG. 6.

1-3. Procedure of the Information Processing According to the Embodiment

Figure 7:
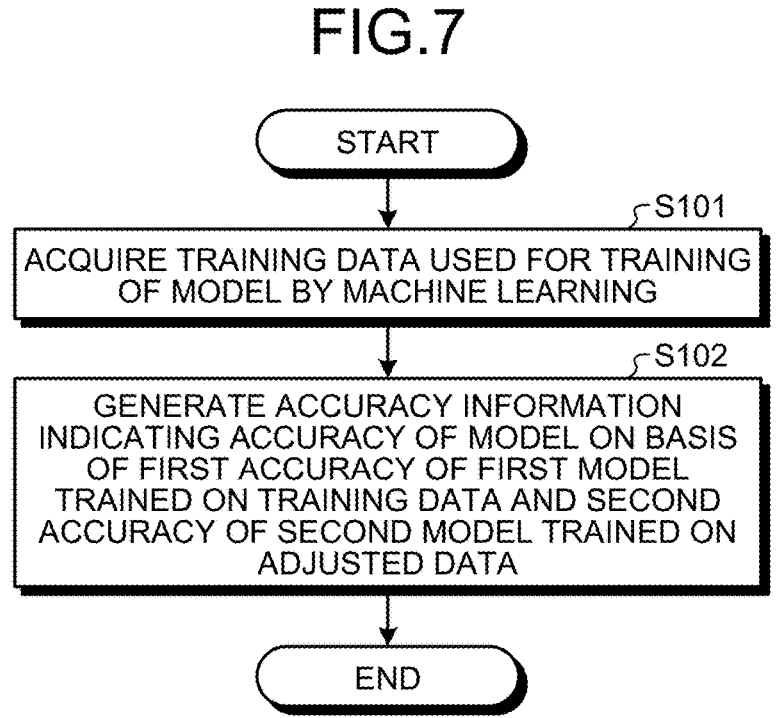
FIG. 7 is a flowchart illustrating a procedure of the information processing according to the embodiment of the present disclosure.
Figure 8:
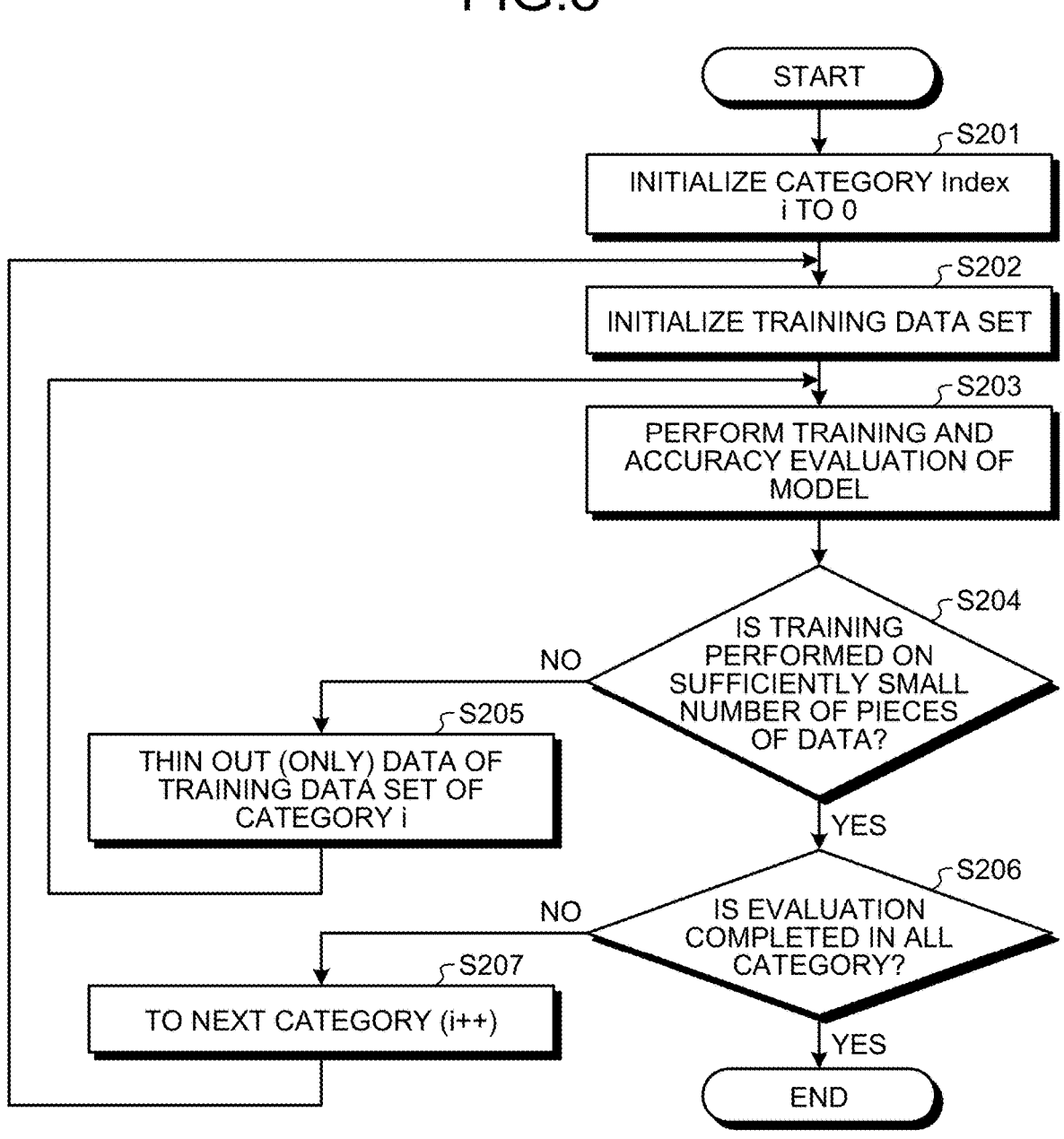
FIG. 8 is a flowchart illustrating the procedure of the information processing according to the embodiment of the present disclosure.

Next, the procedure of the information processing according to the embodiment will be described with reference to FIG. 7 and FIG. 8. FIG. 7 and FIG. 8 are flowcharts illustrating the procedure of the information processing according to the embodiment of the present disclosure. Specifically, FIG. 7 is a flowchart illustrating an outline of the procedure of the information processing. Also, FIG. 8 is a flowchart illustrating details of the procedure of the information processing.

First, an outline of a flow of the information processing according to the embodiment of the present disclosure will be described with reference to FIG. 7. As illustrated in FIG. 7, the information processing device 100 acquires the training data used for the training of the model by machine learning (Step S101). For example, the information processing device 100 acquires the data set DS1.

The information processing device 100 generates the accuracy information indicating the accuracy of the model on the basis of the first accuracy of the first model trained on the training data and the second accuracy of the second model trained on the adjusted data (Step S102). For example, on the basis of the first accuracy of the first model trained on the training data and the second accuracy of the second model trained on the adjusted data, the information processing device 100 generates the graph GR11 indicating the accuracy of the model. Then, the information processing device 100 may display the accuracy information indicating the accuracy of the generated model.

Next, details of the flow of the information processing according to the embodiment of the present disclosure will be described with reference to FIG. 8. As illustrated in FIG. 8, the information processing device 100 initializes a category Index i to 0 (Step S201). For example, the information processing device 100 initializes a value of the category "i" that is a variable used for loop processing to "0". In the example of FIG. 1, for example, a category "0" corresponds to the "race A", a category "1" corresponds to the "race B", a category "2" corresponds to the "race C", and a category "3" corresponds to the "race D".

Then, the information processing device 100 initializes the training data set (Step S202). For example, the information processing device 100 sets the data set DS1 as the training data set.

Then, the information processing device 100 performs training and accuracy evaluation of the model (Step S203). For example, immediately after the data set DS1 is set as the training data set, the information processing device 100 trains the model (first model) by using the entire data set DS1 and evaluates the accuracy of the model. For example, the information processing device 100 starts from complete data. Also, after the number of pieces of data is adjusted, the information processing device 100 trains the model (second model) by using the adjusted data set acquired by the adjustment of the number of pieces of data from the data set DS1, and evaluates the accuracy of the model.

The information processing device 100 determines whether the training is performed on a sufficiently small number of pieces of data (Step S204). In a case where the training on the sufficiently small number of pieces of data is not performed (Step S204; No), the information processing device 100 thins out (only) data of the training data set of the category i (Step S205). For example, in a case where "i" is "0" and the category is "0", the number of pieces of data corresponding to the category "race A" in the training data set is reduced. Also, in a case where "i" is "1" and the category is "1", the number of pieces of data corresponding to the category "race B" in the training data set is reduced.

After thinning out the data of the corresponding category in Step S205, the information processing device 100 returns to Step S203 and repeats the processing by using the thinned-out data (adjusted data).

In a case where the training on the sufficiently small number of pieces of data is performed (Step S204; Yes), the information processing device 100 determines whether the evaluation is completed in all the categories (Step S206). In a case where the evaluation is not completed in all the categories (Step S206; No), the information processing device 100 makes the processing transition to a next category (i++) (Step S207). For example, in a case where "i" is "0", 1 is added to "i" and "i" is updated to "1". In this case, after the processing targeting the category "race A" is completed, transition to processing targeting the category "race B" is made by the update of "i" from "0" to "1".

After making the target of the processing transition to the next category in Step S207, the information processing device 100 returns to Step S202 and repeats the processing with the next category as the target.

In a case of completing the evaluation in all the categories (Step S206; Yes), the information processing device 100 ends the processing.

For example, by the processing procedure in a manner illustrated in FIG. 8, the information processing device 100 performs a loop for each category, and performs training and calculation of an (accuracy) index related to bias and fairness for the designated number of times while reducing the data by half and half from the original number of pieces of data. For example, in a case of face detection from an image with race being a category, the information processing device 100 plots detection accuracy while reducing the number of pieces of training data of each race by half.

1-4. Display Example

Figure 9:
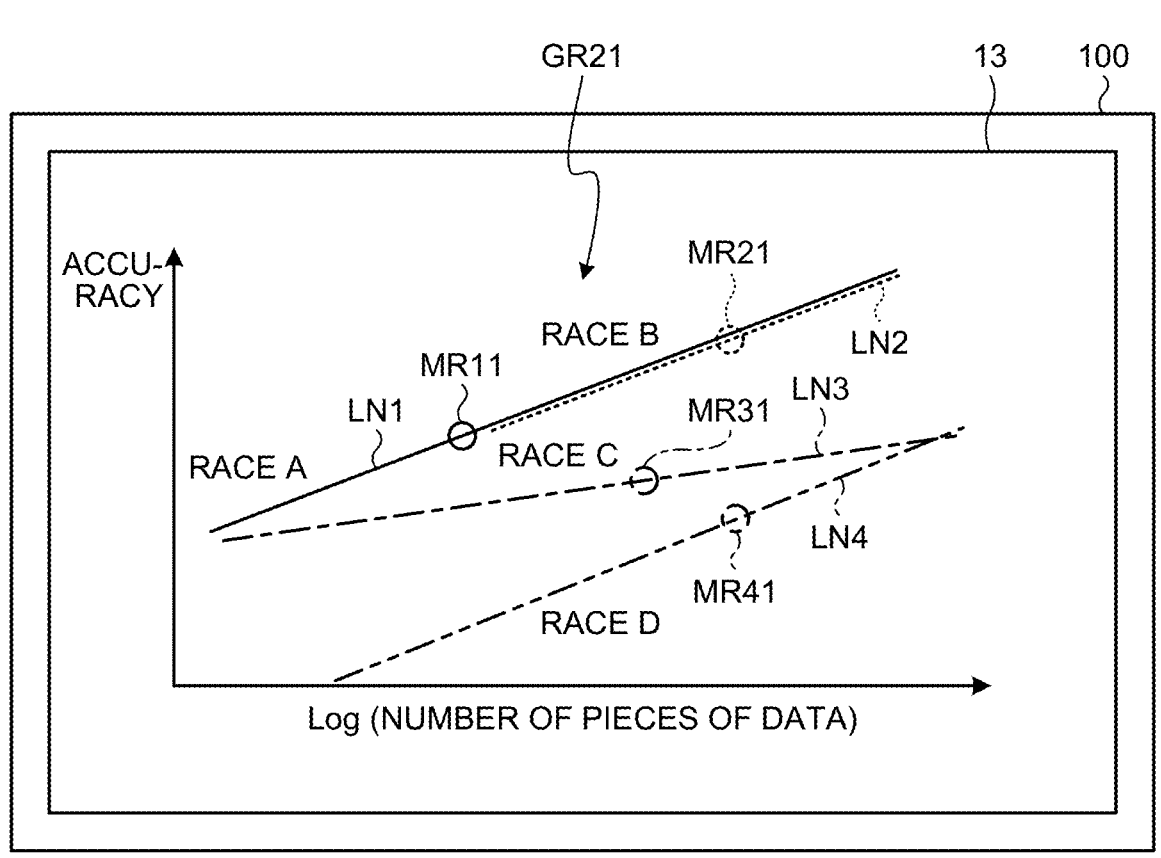
FIG. 9 is a view illustrating an example of a display of accuracy information.

A display of the accuracy information will be described with reference to FIG. 9. FIG. 9 is a view illustrating an example of the display of the accuracy information.

A graph GR21 in FIG. 9 corresponds to the graph GR11 in FIG. 1. In the graph GR21 in FIG. 9, a case where information indicating the accuracy, with respect to each category, of the first model generated by utilization of the entire training data and a prediction line of each category in the graph GR11 in FIG. 1 are displayed is illustrated. Specifically, an example in which the measurement MR11 to MR41 and the prediction lines LN1 to LN4 of the categories "race A", "race B", "race C", and "race D" in the graph GR11 in FIG. 1 are displayed is illustrated in the graph GR21.

The information processing device 100 generates the graph GR21. The information processing device 100 generates the graph GR21 illustrating a relationship between the plurality of categories with respect to the accuracy of the model. The information processing device 100 displays the graph GR21 on the display unit 13.

The user who checks the graph GR21 displayed on the display unit 13 can grasp a degree of difficulty in accuracy improvement in the category "race A" from the current accuracy of the category "race A" and the prediction line indicating a change in the accuracy in response to an increase/decrease of the data. For example, the user who checks the graph GR21 displayed on the display unit 13 can grasp the degree of difficulty in the accuracy improvement in the category "race A" from a slope of the prediction line of the category "race A". Also, similarly to the category "race A", with respect to the categories "race B", "race C", and "race D", it is possible to grasp, from the graph GR21, a degree of difficulty in accuracy improvement in each category from the current accuracy and prediction lines indicating changes in the accuracy in response to an increase/decrease of data.

For example, since the slope of the prediction line of the category "race C" is small, the user can recognize that the category "race C" is a category in which the accuracy improvement is difficult. For example, with respect to the category "race D", the slope of the prediction line is larger than the slope of the prediction line of the category "race C" although the current accuracy is lower than the current accuracy of the category "race C". Thus, the user can recognize that the category "race D" is a category in which the degree of difficulty in the accuracy improvement is not higher than that of the category "race C".

Note that FIG. 9 is an example, and the information processing device 100 may display, with respect to the categories "race A", "race B", "race C", and "race D", the measurement MR12 to MR42, MR13 to MR43, and the like of the second model generated on data in which the number of pieces of data is adjusted.

1-5. Target Accuracy (Target Value)

From here, the target accuracy (target value) will be described with reference to FIG. 10 and FIG. 11.

1-5-1. Relationship Between the Target Accuracy (Target Value) and the Number of Pieces of Data First, a graph display including the target accuracy will be described with reference to FIG. 10. FIG. 10 is a view illustrating the relationship between the target accuracy and the number of pieces of data. Specifically, FIG. 10 is a view illustrating a graph including the target accuracy and accuracy of each category.

Figure 10:
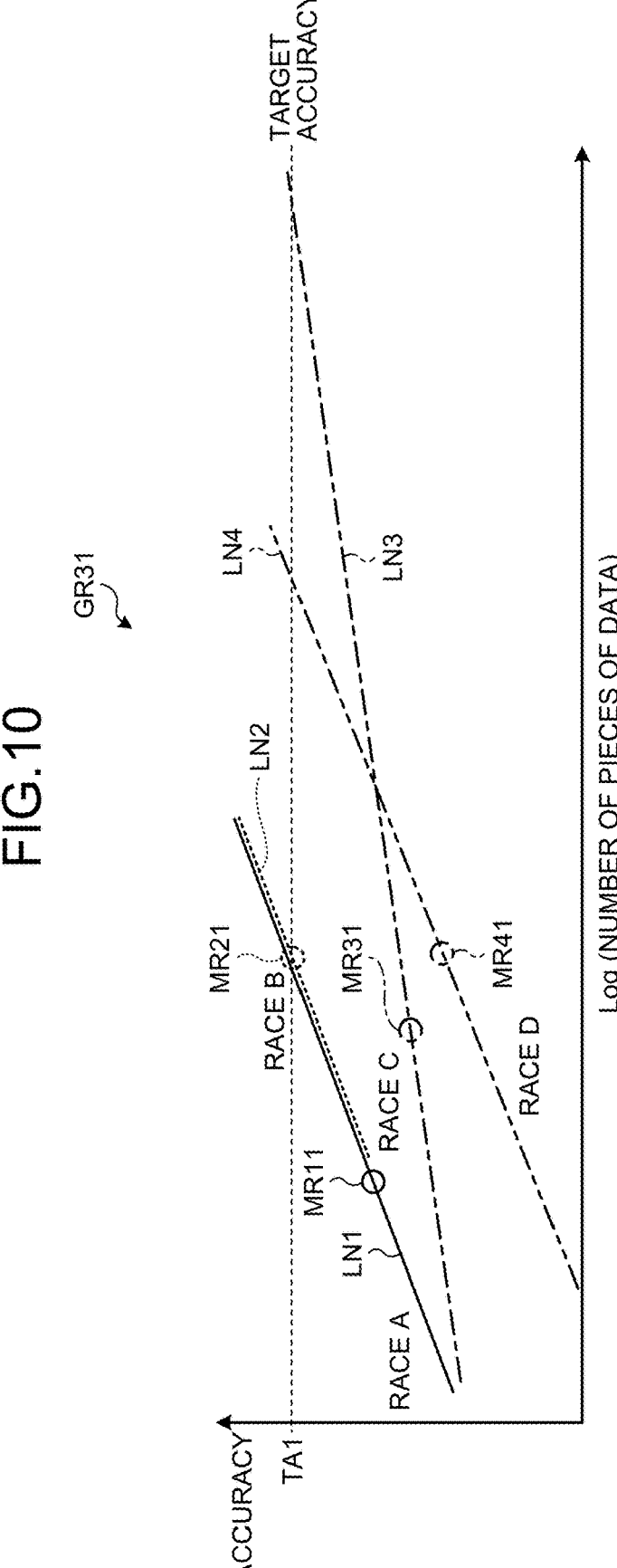
FIG. 10 is a view illustrating a relationship between target accuracy and the number of pieces of data.

A graph GR31 illustrated in FIG. 10 includes the measurement MR11 to MR41 and the prediction lines LN1 to LN4 of the categories "race A", "race B", "race C", and "race D", and target accuracy TA1. The information processing device 100 generates the graph GR31. The information processing device 100 may display the graph GR31 on the display unit 13.

The information processing device 100 can provide information to the user by the graph GR31 in such a manner that a relationship between the accuracy of each of the categories "race A", "race B", "race C", and "race D" and the target accuracy TA1 can be intuitively grasped. In the example of FIG. 10, it is indicated in the graph GR31 that the category "race B" already reaches the target accuracy TA1 and the remaining categories "race A", "race C", and "race D" do not reach the target accuracy TA1.

In addition, the graph GR31 also indicates the number of pieces of data required for each of the categories "race A", "race C", and "race D" to reach the target accuracy TA1. For example, with respect to the category "race A", a position on a horizontal axis "log (number of pieces of data)" which position corresponds to the measurement MR11 in the graph GR31 indicates the number of pieces of data (current number of pieces of data) that corresponds to the category "race A" and that is included in the training data at that time. Also, with respect to the category "race A", a position on the horizontal axis "log (number of pieces of data)" which position corresponds to an intersection of the prediction line LN1 and the target accuracy TA1 in the graph GR31 indicates the number of pieces of data that corresponds to the category "race A" and that is required to achieve the target accuracy TA1 (required number of pieces of data).

The user who checks the graph GR31 displayed on the display unit 13 can grasp a relationship between the target accuracy TA1 and the current accuracy with respect to the category "race A" from the current number of pieces of data in the category "race A" and the required number of pieces of data in the category "race A". Also, the user who checks the graph GR31 displayed on the display unit 13 can grasp how much the number of pieces of data needs to be increased in order to achieve the target accuracy TA1 for the category "race A". Also, similarly to the category "race A", for the categories "race C" and "race D", it is indicated in the graph GR31 how much the number of pieces of data needs to be increased in order to achieve the target accuracy TA1 from the current number of pieces of data and the required number of pieces of data.

The information processing device 100 may perform the bias adjustment processing on the basis of the relationship between the accuracy of each of the categories and the target accuracy TA1 in a manner illustrated in FIG. 10. For example, on the basis of the predicted change in the identification accuracy, the generation unit 155 or the like of the control unit 15 of the information processing device 100 may adjust the number of pieces of data used for the training or change the identification model in such a manner that the predicted change in the identification accuracy becomes a predetermined target value.

In the example of FIG. 10, since the categories "race A", "race C", and "race D" do not reach the target accuracy TA1, the information processing device 100 may increase the number of pieces of data corresponding to the categories "race A", "race C", and "race D". For example, the information processing device 100 may calculate the number of pieces of data required for the category "race A" to reach the target accuracy TA1 (required number of pieces of data) on the basis of the measurement MR11 and the prediction line LN1 of the category "race A".

Then, the information processing device 100 may adjust the number of pieces of data in the category "race A" on the basis of information of the calculated required number of pieces of data. In this case, the information processing device 100 performs adjustment processing in such a manner as to increase the data of the category "race A" for the required number of pieces of data. For example, in a case where there is data of the category "race A" which data is not yet used for the training in the data information storage unit 141 (see FIG. 4), the information processing device 100 may use the required number of pieces of data in the data for the training.

Also, the information processing device 100 may request data from an external device that provides training data providing service, and acquire necessary data from the external device. For example, the information processing device 100 may acquire the required number of pieces of data corresponding to the "race A" from the external device by transmitting information indicating the category "race A" and the required number of pieces of data to the external device. Similarly to the category "race A", with respect to the categories "race C" and "race D", the information processing device 100 may calculate the required number of pieces of data and acquire the required number of pieces of data corresponding to "race C" and "race D" from the data information storage unit 141 (see FIG. 4) or the external device.

Also, in a case where there is a category exceeding the target accuracy (excess category), the information processing device 100 may make the identification accuracy (accuracy) of the excess category closer to the target accuracy TA1 by reducing the number of pieces of data in the excess category. In such a manner, the information processing device 100 makes the accuracy closer to desired accuracy by adjusting the number of pieces of data not only by increasing the number of pieces of data but also by reducing the number of pieces of data. As a result, the information processing device 100 can make the identification accuracy (accuracy)

of all the categories closer to the target accuracy TA1, and control a variation in a system among the categories.

Also, the information processing device 100 may change the model on the basis of the predicted change in the identification accuracy. The information processing device 100 changes the model in a case where it is difficult to achieve the target accuracy by the adjustment of the number of pieces of data used for the training. The information processing device 100 changes the model in a case where the increase in the number of pieces of data required to achieve the target accuracy is equal to or larger than a predetermined threshold. In the example of FIG. 10, the information processing device 100 calculates the number of pieces of data required for the category "race C" to reach the target accuracy TA1 (required number of pieces of data NM) on the basis of the measurement MR31 and the prediction line LN3 of the category "race C", and compares the required number of pieces of data NM with a threshold (threshold TH). The information processing device 100 changes the model in a case where the required number of pieces of data NM is equal to or larger than the threshold TH as a result of the comparison between the required number of pieces of data NM and the threshold TH.

Note that the information processing device 100 may determine whether to change the model on the basis of various conditions. For example, the information processing device 100 may change the model in a case where there is a category that cannot achieve the target accuracy. For example, the information processing device 100 may change the model in a case where there is a category in which the required number of pieces of data cannot be calculated. For example, the information processing device 100 may change the model in a case where there is a category in which the required number of pieces of data is infinite. For example, the information processing device 100 may change the model in a case where there is a category in which a slope of the prediction line is 0 and the target accuracy cannot be achieved. In such a manner, in a case where it is difficult to eliminate the bias by adjusting the data, the information processing device 100 can increase a possibility of eliminating the bias by changing the model itself.

The information processing device 100 changes the model by various modes. For example, the information processing device 100 changes the model by changing the network structure of the model. For example, the information processing device 100 changes the model by changing the number of layers or the number of nodes of the model. In the example of FIG. 10, the information processing device 100 changes the model M1 to a model M51 by changing the network structure (first network structure) of the model M1 to another network structure (second network structure). For example, the information processing device 100 makes a change to the model M51 having more layers and nodes than the model M1. For example, the information processing device 100 may select a model to be used from the model information storage unit 142 (see FIG. 5). For example, in a case where the model M1 is changed to another model, the information processing device 100 may select a model having the same use as the model M1 (such as model M51) among models in the model information storage unit 142. Note that the information processing device 100 does not necessarily change the network structure in the above manner, and may change the model by changing various so-called hyperparameters. For example, the information processing device 100 may change the various hyperparameters that are, for example, calculation algorithms (learning algorithms) such as an activation function and an optimization algorithm. The information processing device 100 may store information indicating order of change in the storage unit 14 (see FIG. 3). For example, in a case of changing the model, the information processing device 100 may store information indicating that the learning algorithm and the network structure are changed in this order. In this case, the information processing device 100 may change the network structure of the model in a case where the bias cannot be eliminated even when the learning algorithm is changed.

1-5-2. Display Example Related to Target Accuracy (Target Value)

Next, the display example related to the target accuracy will be described with reference to FIG. 11. FIG. 11 is a view illustrating an example of a display of the relationship between the target accuracy and the number of pieces of data.

Figure 11:
FIG. 11 is a view illustrating an example of a display of the relationship between the target accuracy and the number of pieces of data.

In the example of FIG. 11, the information processing device 100 generates accuracy information CH1 that indicates, as character information, the relationship between the accuracy corresponding to each category and the target accuracy. The information processing device 100 displays the accuracy information CH1 on the display unit 13. The accuracy information CH1 indicates, as the character information, the number of pieces of data required for the accuracy corresponding to each category to reach the target accuracy. For example, with respect to the category "race A", it is indicated that ten times as much data as the current number of pieces of data are required to achieve the target accuracy. That is, it is indicated that ten times as much data as the current data corresponding to the category "race A" are required for the accuracy corresponding to the category "race A" to achieve the target accuracy.

Also, with respect to the category "race C", it is indicated that 10,000 times as much data as the current number of pieces of data are required to achieve the target accuracy. Also, with respect to the category "race D", it is indicated that 100 times as much data as the current number of pieces of data are required to achieve the target accuracy. Also, in the example of FIG. 11, a case where information is hidden with respect to the category "race B" that already achieves the target accuracy is illustrated. In such a manner, by hiding of the information with respect to the category that already achieves the target accuracy, it may be indicated that the accuracy target is achieved.

Note that the information may also be displayed for a category that achieves the target accuracy. In the example of FIG. 11, with respect to the category "race B", information indicating that the target accuracy is already achieved, such as "target accuracy is already achieved", and information indicating the current accuracy, such as "current accuracy is 0.9" may be displayed.

For example, when the user inputs the target accuracy, the information processing device 100 displays the number of pieces of data required to achieve the target accuracy on the basis of the estimated prediction line. As a result, the information processing device 100 can display the number of pieces of data required to achieve the target accuracy. Also, the information processing device 100 may perform drawing while reducing the entire data instead of reducing a specific category. In such a manner, the information processing device 100 displays the predicted change in the identification accuracy in a graph or text.

1-6. Conceptual Diagram of Processing by an Information Processing System

Next, the processing by the information processing system will be conceptually described with reference to FIG.

Figure 12:
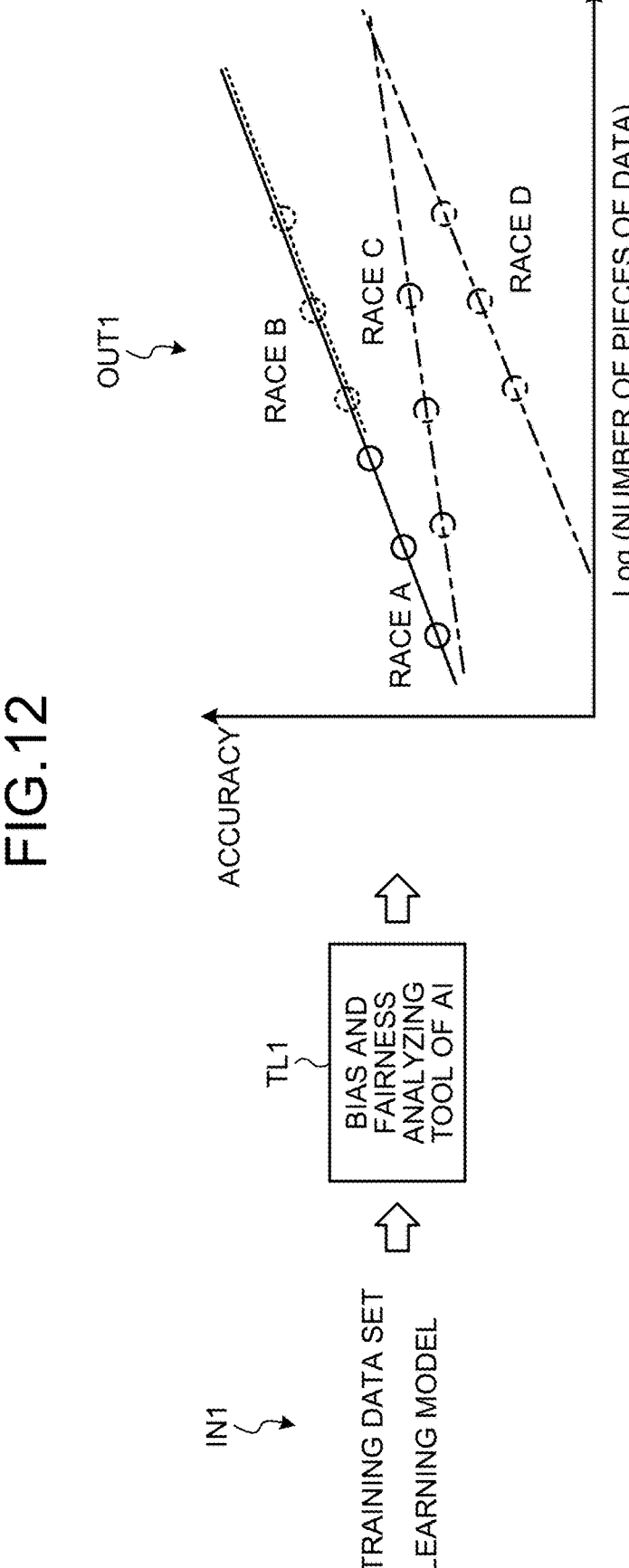
FIG. 12 is a view illustrating an example of a conceptual diagram of processing by an information processing system.

12. FIG. 12 is a view illustrating an example of the conceptual diagram of the processing by the information processing system.

In the example of FIG. 12, input information IN1 including a training data set and a learning model is input to a tool TL1 that trains the model and measures accuracy of the trained model. For example, the tool TL1 is a bias and fairness analyzing tool of AI, and has a function used to analyze the bias (bias) and fairness (fairness) of the model. For example, the function of the tool TL1 may be realized by the acquisition unit 151, the learning unit 152, the calculation unit 153, the prediction unit 154, and the generation unit 155 of the information processing device 100.

The tool TL1 generates an analysis result OUT1 in response to an input of the input information IN1. The analysis result OUT1 generated by the tool TL1 in the example of FIG. 12 corresponds to the graph GR11 in FIG. 1. For example, a function of displaying the analysis result OUT1 by the tool TL1 may be realized by the display unit 13 of the information processing device 100. The analysis result OUT1 indicates an example of information presented to the user.

For example, a user of the information processing device 100, such as a deep learning developer trains a deep learning-based model (such as image recognition machine) on an existing data set. Then, with respect to the trained model, the developer executes a function realized by the present invention. An information processing system 1 displays a prediction of how much data is to be increased to improve performance.

For example, a developer of the AI or the like is assumed to be the user of the tool TL1. Needs of such a user include acquiring a guideline for improving the bias and fairness, and knowing a difficulty level of improving the bias and fairness. By the functions of the tool TL1 realized by the information processing device 100, it possible to provide the user with appropriate information with respect to the user needs in a manner described above.

2. Other Embodiments

The processing according to each of the above-described embodiments may be performed in various different forms (modification examples) other than each of the above-described embodiments. The information processing device that determines a providing method of data is not limited to the above-described example, and may be in various modes. This point will be described below. Note that a description of points similar to those of the information processing device 100 according to the embodiment will be arbitrarily omitted in the following.

2-1. Modification Examples

Figures 13, 14:
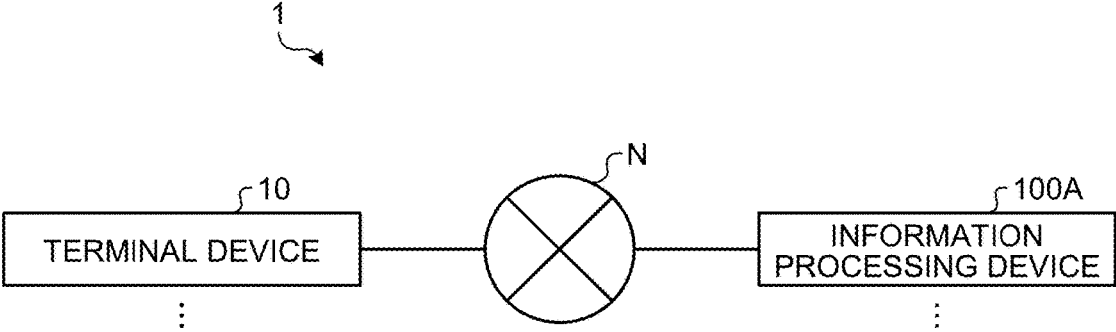
FIG. 13 is a view illustrating a configuration example of an information processing system according to a modification example of the present disclosure.
FIG. 14 is a view illustrating a configuration example of an information processing device according to the modification example of the present disclosure.

For example, in the above-described example, an example in which the information processing device that performs the information processing is the information processing device 100 has been described. However, an information processing device and a terminal device that displays information may be separate. This point will be described with reference to FIG. 13 and FIG. 14. FIG. 13 is a view illustrating a configuration example of an information processing system according to the modification example of the present disclosure. FIG. 14 is a view illustrating a configuration example of an information processing device according to the modification example of the present disclosure.

As illustrated in FIG. 13, an information processing system 1 includes a terminal device 10 and an information processing device 100A. The terminal device 10 and the information processing device 100A are connected to each other via a communication network N communicably in a wired or wireless manner. Note that the information processing system 1 illustrated in FIG. 13 may include a plurality of terminal devices 10 and a plurality of information processing devices 100A. In this case, the information processing devices 100A may communicate with the terminal devices 10 via the communication network N, provide information to the terminal devices 10, and train a model on the basis of information such as parameters designated by the user via the terminal devices 10.

The terminal device 10 is an information processing device used by the user. The terminal device 10 is realized by, for example, a notebook personal computer (PC), a desktop PC, a smartphone, a tablet terminal, a cellular phone, a personal digital assistant (PDA), or the like. Note that the terminal device 10 may be any terminal device as long as the information provided by the information processing device 100A can be displayed. The terminal device 10 is a client terminal.

Also, the terminal device 10 receives an operation by the user. In the example illustrated in FIG. 13, the terminal device 10 displays the information provided by the information processing device 100A on a screen. Also, the terminal device 10 transmits information such as information indicating the operation by the user to the information processing device 100A. For example, the terminal device 10 transmits, to the information processing device 100A, instruction information that is from the user and that instructs to execute the learning processing. The terminal device 10 displays information received from the information processing device 100A. The terminal device 10 displays accuracy information received from the information processing device 100A. The terminal device 10 displays the accuracy information indicating a measurement result and a prediction result of accuracy of a model. The terminal device 10 displays a graph received from the information processing device 100A.

The information processing device 100A realizes information processing similar to that of the information processing device 100 except that the information processing device 100A is different from the information processing device 100 in a point of providing information to the terminal device 10 and acquiring information from the terminal device 10. The information processing device 100A is a server that provides service to the terminal device 10 that is the client terminal. For example, the information processing device 100A performs generation processing of generating accuracy information on the basis of the instruction information acquired from the terminal device 10, and transmits the generated accuracy information to the terminal device 10.

As illustrated in FIG. 14, the information processing device 100A includes a communication unit 11, a storage unit 14, and a control unit 15A. The communication unit 11 is connected to the communication network N (such as the Internet) in a wired or wireless manner, and transmits/receives information to/from the terminal device 10 via the communication network N. In this case, the information processing device 100A does not necessarily have a function of displaying information, such as that of the information processing device 100. Note that the information processing device 100A may include an input unit (such as keyboard or mouse) and a display unit (such as liquid crystal display) used by an administrator or the like of the information processing device 100A.

The control unit 15A is realized, for example, when a program (such as information processing program according to the present disclosure) stored in the information processing device 100A is executed by a CPU, MPU, or the like with a RAM or the like as a work area. Also, the control unit 15A may be realized by, for example, an integrated circuit such as an ASIC or an FPGA.

As illustrated in FIG. 14, the control unit 15A includes an acquisition unit 151A, a learning unit 152, a calculation unit 153, a prediction unit 154, a generation unit 155, and a transmission unit 156A, and realizes or executes functions or actions of information processing described in the following. Note that an internal configuration of the control unit 15A is not limited to the configuration illustrated in FIG. 14, and may be another configuration as long as being a configuration of performing information processing described later.

The acquisition unit 151A acquires various kinds of information similarly to the acquisition unit 151. The acquisition unit 151A acquires various kinds of information from the terminal device 10. The acquisition unit 151A acquires operation information of the user from the terminal device 10. The acquisition unit 151A acquires various kinds of information from the storage unit 14.

The transmission unit 156A provides various kinds of information similarly to the transmission unit 156. The transmission unit 156A provides various kinds of information to the terminal device 10. The transmission unit 156A transmits the various kinds of information to the terminal device 10. The transmission unit 156A provides information generated by the generation unit 155 to the terminal device 10. The transmission unit 156A transmits the information to be displayed on the terminal device 10 to the terminal device 10.

2-2. Other Configuration Examples

Also, the processing according to each of the above-described embodiments and modification examples may be performed in various different forms (modification examples) other than the above-described embodiments and modification examples. For example, a device that trains a model (learning device), a device that measures accuracy by using the model (measurement device), a device that predicts the accuracy of the model (prediction device), and a device that generates accuracy information (generation device) may be separate or integrated. For example, the device that measures the accuracy by using the model (measurement device), the device that predicts the accuracy of the model (prediction device), and the device that generates the accuracy information (generation device) may be integrated. In this case, the information processing system may include an information processing device that performs measurement processing, prediction processing, and generation processing, and a learning device that performs learning processing. Note that the above is an example, and the information processing system may be realized by various configurations.

2-3. Others

Also, among the pieces of processing described in the above embodiments, all or a part of the processing described to be automatically performed can be manually performed, or all or a part of the processing described to be manually performed can be automatically performed by a known method. In addition, a processing procedure, specific name, and information including various kinds of data and parameters illustrated in the above document or drawings can be arbitrarily changed unless otherwise specified. For example, various kinds of information illustrated in each drawing are not limited to the illustrated information.

Also, each component of each of the illustrated devices is a functional concept, and does not need to be physically configured in a manner illustrated in the drawings. That is, a specific form of distribution/integration of each device is not limited to what is illustrated in the drawings, and a whole or part thereof can be functionally or physically distributed/integrated in an arbitrary unit according to various loads and usage conditions.

Also, the above-described embodiments and modification examples can be arbitrarily combined in a range in which the processing contents do not contradict each other.

Also, an effect described in the present description is merely an example and is not a limitation, and there may be a different effect.

3. Effects According to the Present Disclosure

As described above, a bias adjustment device (information processing device 100 or 100A in the embodiment) according to the present disclosure is a bias adjustment device related to an identification model by machine learning using training data, and includes a calculation unit (calculation 153 in the embodiment), a prediction unit (prediction unit 154 in the embodiment), and a control unit (generation unit 155 in the embodiment). The calculation unit calculates first identification accuracy of an identification model trained on first training data, and second identification accuracy of the identification model trained on second training data acquired by an adjustment of the number of pieces of data with respect to the first training data. The prediction unit predicts a change in the identification accuracy with respect to the number of pieces of training data on the basis of the first identification accuracy and the second identification accuracy. On the basis of the predicted change in the identification accuracy, the control unit adjusts the number of pieces of data used for training or changes the identification model in such a manner that the predicted change in the identification accuracy becomes a predetermined target value.

As a result, by predicting the change in the identification accuracy with respect to the number of pieces of training data on the basis of the first identification accuracy and the second identification accuracy of the identification model trained by the adjustment of the training data and by adjusting the number of pieces of data used for the training or changing the identification model on the basis of the predicted change in the identification accuracy, the bias adjustment device according to the present disclosure can generate a model in which an influence of bias is controlled. Thus, the bias adjustment device can make it possible to appropriately execute processing related to the training of the model by using the model trained on the adjusted data.

Also, the bias adjustment device includes a display unit (display unit 13 in the embodiment). The display unit displays the predicted change in the identification accuracy in a graph or text. As a result, the bias adjustment device can provide information appropriately by displaying the predicted change in the identification accuracy in various modes. Thus, the bias adjustment device can make it possible to appropriately execute the processing related to the training of the model by using the model trained on the adjusted data.

Also, the training data is at least data related to race, gender, an address, income, or educational background. This allows the bias adjustment device to appropriately predict biases related to the race, gender, address, income, or educational background.

As described above, the information processing device (information processing device 100 or 100A in the embodiment) according to the present disclosure includes an acquisition unit (acquisition unit 151 in the embodiment) and a generation unit (generation unit 155 in the embodiment). The acquisition unit acquires training data used for the training of the model by machine learning. The generation unit generates accuracy information indicating accuracy of the model on the basis of first accuracy of a first model, which is a model trained on the training data, and second accuracy of a second model that is a model trained on adjusted data in which the number of pieces of data of the training data is adjusted according to a target for which the number of pieces of data is adjusted.

As a result, by generating the accuracy information indicating the accuracy of the model by using two kinds of accuracy that are the first accuracy of the first model and the second accuracy of the second model, the information processing device according to the present disclosure can appropriately generate the information related to the accuracy of the model by the adjustment of the data. Thus, the information processing device can make it possible to appropriately execute the processing related to the training of the model by using the model trained on the adjusted data.

Also, the generation unit generates the accuracy information on the basis of the second model trained on the adjusted data in which the number of pieces of data is reduced from the training data. As a result, by generating the accuracy information indicating what the accuracy will be in a case where the number of pieces of data is reduced from the training data, the information processing device can appropriately generate information related to the accuracy of the model by the adjustment of the data.

Also, on the basis of the first accuracy and the second accuracy, the generation unit generates the accuracy information indicating an accuracy change in the model due to the adjustment of the number of pieces of data according to the target. As a result, by generating the accuracy information indicating the accuracy change in the model due to the adjustment of the number of pieces of data according to the target, the information processing device can appropriately generate the information related to the accuracy of the model by adjusting the data.

Also, the generation unit generates the accuracy information on the basis of the first accuracy of the first model which accuracy is measured by utilization of evaluation data and the second accuracy of the second model which accuracy is measured by utilization of the evaluation data. As a result, by generating the accuracy information by using the accuracy measured by utilization of the evaluation data, the information processing device can appropriately generate the information related to the accuracy of the model by adjusting the data.

Also, on the basis of the first accuracy and the second accuracy, the generation unit generates the accuracy information indicating a prediction of the accuracy change in the model of a case where the number of pieces of data is adjusted according to the target. As a result, by generating the accuracy information indicating the prediction of the accuracy change in the model of a case where the number of pieces of data is adjusted according to the target, the information processing device can appropriately generate the information related to the accuracy of the model by adjusting the data.

Also, the generation unit generates the accuracy information indicating the prediction of the accuracy change in the model of a case where the number of pieces of data of the training data is increased. As a result, by generating the accuracy information indicating the prediction of the accuracy change in the model of a case where the number of pieces of data of the training data is increased, the information processing device can appropriately generate the information related to the accuracy of the model by adjusting the data.

Also, the generation unit generates the accuracy information including a prediction line of the accuracy of the model of a case where the number of pieces of data of the training data is increased. As a result, by generating the accuracy information including the prediction line of the accuracy of the model of a case where the number of pieces of data of the training data is increased, the information processing device can appropriately generate the information related to the accuracy of the model by adjusting the data.

Also, on the basis of the second accuracy of the second model trained on the adjusted data in which the number of pieces of data of the training data is adjusted according to a category indicating a classification related to the target, the generation unit generates the accuracy information related to the category. As a result, by generating the accuracy information related to the category, the information processing device can appropriately generate the information related to the accuracy of the model by adjusting the data.

Also, on the basis of the second accuracy of the second model trained on the adjusted data in which the number of pieces of data of the training data is adjusted according to one category of a plurality of the categories of the target, the generation unit generates the accuracy information of the model which information indicates the accuracy of the model with respect to the one category. As a result, by generating the accuracy information of the model which information indicates the accuracy of the model with respect to the one category among the plurality of categories of the target, the information processing device can appropriately generate the information related to the accuracy of the model by adjusting the data.

Also, the generation unit generates the accuracy information on the basis of the second accuracy of the second model trained on the adjusted data in which the number of pieces of data corresponding to the one category in the training data is adjusted. As a result, by measuring the accuracy while adjusting the number of pieces of data corresponding to the one category in the training data and by generating the accuracy information, the information processing device can appropriately generate the information related to the accuracy of the model by adjusting the data.

Also, the acquisition unit acquires the training data including data corresponding to each of the plurality of categories. The generation unit generates the accuracy information on the basis of the second accuracy of the second model trained on the adjusted data in which the number of pieces of data corresponding to one category in the training data is reduced. As a result, by measuring the accuracy while reducing the number of pieces of data corresponding to the one category in the training data and by generating the accuracy information, the information processing device can appropriately generate the information related to the accuracy of the model by adjusting the data.

Also, the generation unit generates the accuracy information on the basis of the first accuracy of the first model with respect to the one category and the second accuracy of the second model with respect to the one category. As a result, by generating the accuracy information of the one category by using the first accuracy of the first model with respect to the one category in the training data and the second accuracy of the second model with respect to the one category, the information processing device can appropriately generate the information related to the accuracy of the model by adjusting the data.

Also, the generation unit generates the accuracy information on the basis of the first accuracy of the first model which accuracy is measured by utilization of the evaluation data corresponding to the one category and the second accuracy of the second model which accuracy is measured by utilization of the evaluation data corresponding to the one category. As a result, by generating the accuracy information by using the accuracy measured by utilization of the evaluation data corresponding to the one category, the information processing device can appropriately generate the information related to the accuracy of the model by adjusting the data.

Also, the generation unit generates the accuracy information indicating the accuracy of the model with respect to each of the plurality of categories on the basis of a plurality of pieces of the second accuracy of a plurality of the second models respectively trained on a plurality of pieces of the adjusted data in which the number of pieces of data of the training data is adjusted for each of the plurality of categories. As a result, by generating the accuracy information indicating the accuracy of the model with respect to each of the plurality of categories, it becomes possible to perform a comparison between the categories. Thus, the information processing device can appropriately generate the information related to the accuracy of the model by adjusting the data.

Also, the generation unit generates the accuracy information on the basis of a plurality of pieces of the first accuracy of the first model corresponding to each of the plurality of categories and the plurality of pieces of second accuracy of the plurality of second models respectively corresponding to the plurality of categories. As a result, by generating the accuracy information of each category by using the first accuracy and second accuracy of each of the plurality of categories, it becomes possible to perform the comparison between categories. Thus, the information processing device can appropriately generate the information related to the accuracy of the model by adjusting the data.

Also, the generation unit generates the accuracy information on the basis of the plurality of pieces of first accuracy of the first model, which accuracy is measured by utilization of the evaluation data corresponding to each of the plurality of categories, and the plurality of pieces of second accuracy respectively corresponding to the plurality of categories. As a result, by generating the accuracy information by using the accuracy measured by utilization of the evaluation data corresponding to each of the plurality of categories, the information processing device can appropriately generate the information related to the accuracy of the model by adjusting the data.

Also, on the basis of the plurality of pieces of first accuracy respectively corresponding to the plurality of categories and the plurality of pieces of second accuracy respectively corresponding to the plurality of categories, the generation unit generates the accuracy information indicating a relationship between the plurality of categories with respect to the accuracy of the model. As a result, it becomes possible to grasp states of bias and fairness between the categories by generating the accuracy information indicating the relationship between the plurality of categories with respect to the accuracy of the model, the information processing device can appropriately generate the information related to the accuracy of the model by adjusting the data.

Also, the information processing device includes a display unit (display unit 13 in the embodiment). The display unit displays the accuracy information. Thus, the information processing device can provide appropriate information related to the accuracy of the model.

4. Hardware Configuration

Figure 15:
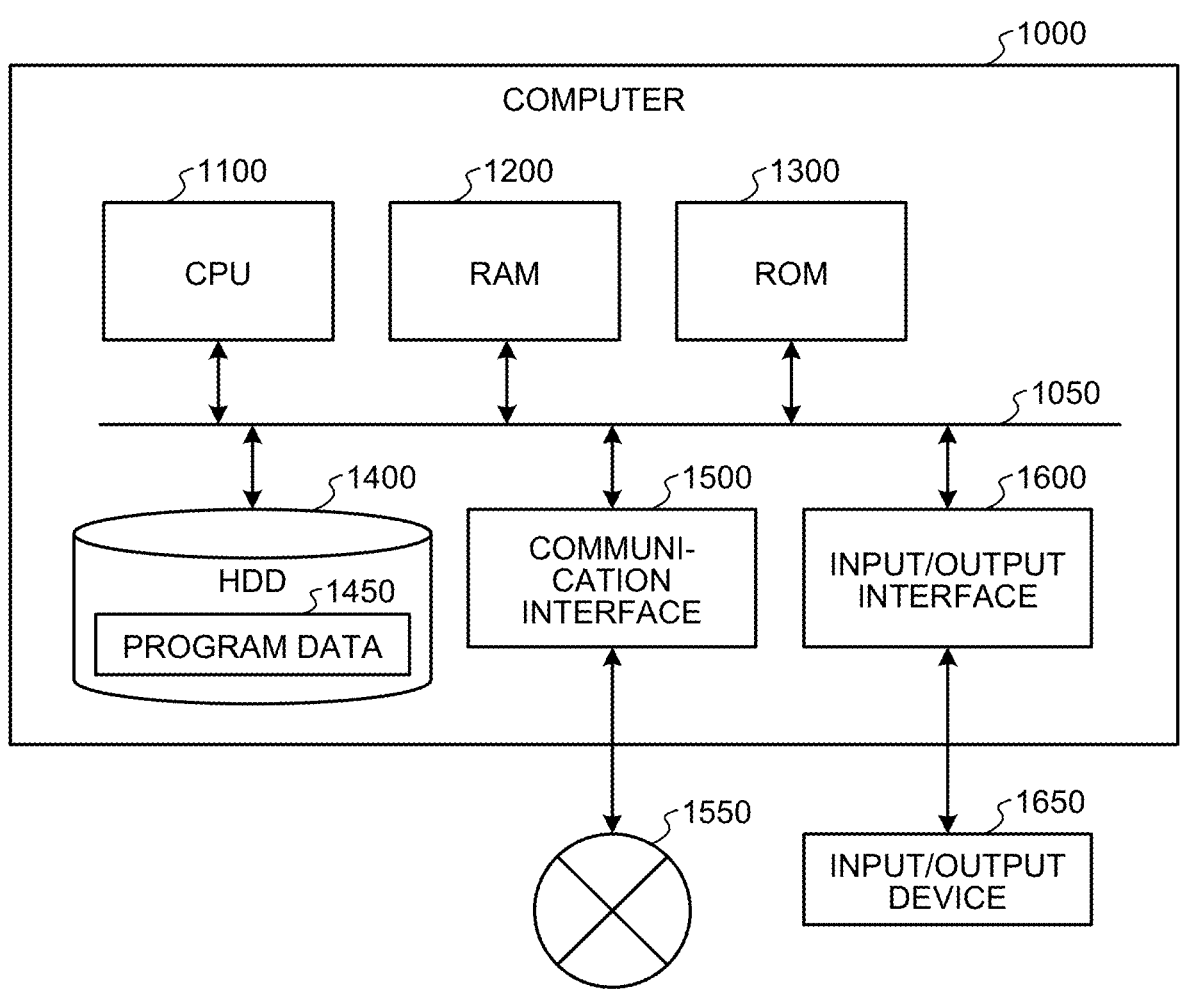
FIG. 15 is a hardware configuration diagram illustrating an example of a computer that realizes functions of an information processing device.

The information device such as the information processing device 100 or 100A according to each of the above-described embodiments is realized by, for example, a computer 1000 having a configuration in a manner illustrated in FIG. 15. FIG. 15 is a hardware configuration diagram illustrating an example of the computer 1000 that realizes functions of an information processing device such as the information processing device 100 or 100A. In the following, the information processing device 100 according to the embodiment will be described as an example. The computer 1000 includes a CPU 1100, a RAM 1200, a read only memory (ROM) 1300, a hard disk drive (HDD) 1400, a communication interface 1500, and an input/output interface 1600. Each unit of the computer 1000 is connected by a bus 1050.

The CPU 1100 operates on the basis of programs stored in the ROM 1300 or the HDD 1400, and controls each unit. For example, the CPU 1100 expands the programs, which are stored in the ROM 1300 or the HDD 1400, in the RAM 1200 and executes processing corresponding to various programs.

The ROM 1300 stores a boot program such as a basic input output system (BIOS) executed by the CPU 1100 during activation of the computer 1000, a program that depends on hardware of the computer 1000, and the like.

The HDD 1400 is a computer-readable recording medium that non-temporarily records a program executed by the CPU 1100, data used by the program, and the like. More specifically, the HDD 1400 is a recording medium that records the information processing program according to the present disclosure which program is an example of program data 1450.

The communication interface 1500 is an interface with which the computer 1000 is connected to an external network 1550 (such as the Internet). For example, the CPU 1100 receives data from another equipment or transmits data generated by the CPU 1100 to another equipment via the communication interface 1500.

The input/output interface 1600 is an interface to connect an input/output device 1650 and the computer 1000. For example, the CPU 1100 receives data from an input device such as a keyboard or mouse via the input/output interface 1600. Also, the CPU 1100 transmits data to an output device such as a display, speaker, or printer via the input/output interface 1600. Also, the input/output interface 1600 may function as a medium interface that reads a program or the like recorded on a predetermined recording medium (medium). The medium is, for example, an optical recording medium such as a digital versatile disc (DVD) or phase change rewritable disk (PD), a magneto-optical recording medium such as a magneto-optical disk (MO), a tape medium, a magnetic recording medium, a semiconductor memory, or the like.

For example, in a case where the computer 1000 functions as the information processing device 100 according to the embodiment, the CPU 1100 of the computer 1000 realizes a function of the control unit 15 or the like by executing the information processing program loaded on the RAM 1200. Also, the HDD 1400 stores the information processing program according to the present disclosure and data in the storage unit 14. Note that the CPU 1100 reads the program data 1450 from the HDD 1400 and performs execution thereof, but may acquire these programs from another device via the external network 1550 in another example.

Note that the present technology can also have the following configurations.

(1)

A bias adjustment device for an identification model by machine learning using training data, the bias adjustment device comprising:

a calculation unit that calculates first identification accuracy of the identification model trained on first training data and second identification accuracy of the identification model trained on second training data acquired by an adjustment of number of pieces of data of the first training data;

a prediction unit that predicts a change in identification accuracy with respect to the number of pieces of the training data on a basis of the first identification accuracy and the second identification accuracy; and a control unit that adjusts the number of pieces of data used for the training or changes the identification model, on a basis of the predicted change in the identification accuracy, in such a manner that the predicted change in the identification accuracy becomes a predetermined target value.

(2)

The bias adjustment device according to (1), further comprising a display unit that displays the predicted change in the identification accuracy in a graph or text.

(3)

The bias adjustment device according to (1) or (2), wherein the training data is at least data related to race, gender, an address, income, or educational background.

(4)

An information processing device comprising:

an acquisition unit that acquires training data used for training of a model by machine learning; and a generation unit that generates accuracy information indicating accuracy of the model on a basis of first accuracy of a first model, which is the model trained on the training data, and second accuracy of a second model that is the model trained on adjusted data in which number of pieces of data of the training data is adjusted according to a target for which the number of pieces of data is adjusted.

(5)

The information processing device according to (4), wherein the generation unit generates the accuracy information on a basis of the second model trained on the adjusted data in which the number of pieces of data is reduced from the training data.

(6)

The information processing device according to (4) or (5), wherein the generation unit generates, on a basis of the first accuracy and the second accuracy, the accuracy information indicating an accuracy change in the model due to the adjustment of the number of pieces of data according to the target.

(7)

The information processing device according to any one of (4) to (6), wherein the generation unit generates the accuracy information on a basis of the first accuracy of the first model, which accuracy is measured by utilization of evaluation data, and the second accuracy of the second model which accuracy is measured by utilization of the evaluation data.

(8)

The information processing device according to any one of (4) to (7), wherein the generation unit generates, on a basis of the first accuracy and the second accuracy, the accuracy information indicating a prediction of an accuracy change in the model of a case where the number of pieces of data is adjusted according to the target.

(9)

The information processing device according to any one of (4) to (8), wherein the generation unit generates the accuracy information indicating a prediction of an accuracy change in the model of a case where the number of pieces of data of the training data is increased.

(10)

The information processing device according to any one of (4) to (9), wherein the generation unit generates the accuracy information including a prediction line of the accuracy of the model of a case where the number of pieces of data of the training data is increased.

(11)

The information processing device according to any one of (4) to (10), wherein the generation unit generates the accuracy information related to a category on a basis of the second accuracy of the second model trained on the adjusted data in which the number of pieces of data of the training data is adjusted according to the category indicating a classification related to the target.

(12)

The information processing device according to (11), wherein the generation unit generates, on a basis of the second accuracy of the second model trained on the adjusted data in which the number of pieces of data of the training data is adjusted according to one category among a plurality of categories of the target, the accuracy information of the model which information indicates the accuracy of the model with respect to the one category.

(13)

The information processing device according to (12), wherein the generation unit generates the accuracy information on a basis of the second accuracy of the second model trained on the adjusted data in which the number of pieces of data corresponding to the one category in the training data is adjusted.

(14)

The information processing device according to (12) or (13), wherein the acquisition unit acquires the training data including data corresponding to each of the plurality of categories, and the generation unit generates the accuracy information on a basis of the second accuracy of the second model trained on the adjusted data in which the number of pieces of data corresponding to the one category in the training data is reduced.

(15)

The information processing device according to any one of (12) to (14), wherein the generation unit generates the accuracy information on a basis of the first accuracy of the first model with respect to the one category and the second accuracy of the second model with respect to the one category.

(16)

The information processing device according to (15), wherein the generation unit generates accuracy information on a basis of the first accuracy of the first model which accuracy is measured by utilization of evaluation data corresponding to the one category and the second accuracy of the second model which accuracy is measured by utilization of the evaluation data corresponding to the one category.

(17)

The information processing device according to any one of (12) to (16), wherein the generation unit generates the accuracy information indicating the accuracy of the model with respect to each of the plurality of categories on a basis of a plurality of pieces of the second accuracy of a plurality of the second models respectively trained on a plurality of pieces of the adjusted data in which the number of pieces of data of the training data is adjusted for each of the plurality of categories.

(18)

The information processing device according to (17), wherein the generation unit generates the accuracy information on the basis of a plurality of pieces of first accuracy of the first model corresponding to each of the plurality of categories and the plurality of pieces of second accuracy of the plurality of second models respectively corresponding to the plurality of categories.

(19)

The information processing device according to (18), wherein the generation unit generates the accuracy information on the basis of the plurality of pieces of first accuracy of the first model, which accuracy is measured by utilization of evaluation data corresponding to each of the plurality of categories, and the plurality of pieces of second accuracy respectively corresponding to the plurality of categories.

(20)

The information processing device according to (18) or (19), wherein the generation unit generates the accuracy information indicating a relationship between the plurality of categories with respect to the accuracy of the model on the basis of the plurality of pieces of first accuracy respectively corresponding to the plurality of categories and the plurality of pieces of second accuracy respectively corresponding the plurality of categories.

(21)

The information processing device according to (20), wherein the generation unit generates the accuracy information indicating a bias of accuracy of the model in the plurality of categories.

(22)

The information processing device according to (20) or (21), wherein the generation unit generates the accuracy information indicating a degree of difficulty in accuracy improvement of the model in each of the plurality of categories.

(23)

The information processing device according to any one of (4) to (22), further including a learning unit that trains the model.

(24)

The information processing device according to any one of (4) to (23), further comprising a display unit that displays the accuracy information.

(25)

The information processing device according to (24), wherein the display unit displays the accuracy information as characters.

(26)

The information processing device according to (24) or (25), wherein the display unit displays the accuracy information as a numerical value.

(27)

The information processing device according to any one of (24) to (26), wherein the display unit displays the accuracy information as a diagram.

(28)

The information processing device according to any one of (24) to (27), wherein the display unit displays the accuracy information as a graph.

(29)

The information processing device according to (28), wherein the display unit displays the graph with the accuracy being on a first axis and the number of pieces of data being on a second axis.

(30)

The information processing device according to any one of (24) to (29), wherein the acquisition unit acquires target accuracy indicating a target of the accuracy of the model, and the display unit displays information indicating a relationship between the accuracy of the model and the target accuracy.

(31)

The information processing device according to (30), wherein the display unit displays information indicating a relationship between the number of pieces of data in the accuracy of the model and the number of pieces of data in the target accuracy.

(32)

The information processing device according to (30) or (31), further including an input unit that receives an input of the target accuracy from the user, wherein the acquisition unit acquires the target accuracy received by the input unit.

(33)

The information processing device according to any one of (24) to (32), wherein the generation unit generates the accuracy information indicating a plurality of kinds of accuracy of the model corresponding to a plurality of indexes, and the display unit displays the plurality of kinds of accuracy in a switchable manner.

(34)

The information processing device according to (33), wherein the display unit displays one kind of accuracy among the plurality of kinds of accuracy.

(35)

The information processing device according to (34), wherein the acquisition unit acquires designation information that designates the one kind of accuracy.

(36)

The information processing device according to (34) or (35), wherein the display unit displays the one kind of accuracy designated by the user.

(37)

An information processing method comprising:

executing processing of acquiring training data used for training of a model by machine learning, and generating accuracy information indicating accuracy of the model on a basis of first accuracy of a first model, which is the model trained on the training data, and second accuracy of a second model that is the model trained on adjusted data in which number of pieces of data of the training data is adjusted according to a target for which the number of pieces of data is adjusted.

(38)

An information processing program causing execution of processing of acquiring training data used for training of a model by machine learning, and generating accuracy information indicating accuracy of the model on a basis of first accuracy of a first model, which is the model trained on the training data, and second accuracy of a second model that is the model trained on adjusted data in which number of pieces of data of the training data is adjusted according to a target for which the number of pieces of data is adjusted.

REFERENCE SIGNS LIST

100, 100A INFORMATION PROCESSING DEVICE (BIAS ADJUSTMENT DEVICE)
11 COMMUNICATION UNIT
12 INPUT UNIT
13 DISPLAY UNIT (DISPLAY)
14 STORAGE UNIT
141 DATA INFORMATION STORAGE UNIT
142 MODEL INFORMATION STORAGE UNIT
143 ACCURACY INFORMATION STORAGE UNIT
15, 15A CONTROL UNIT
151, 151A ACQUISITION UNIT
152 LEARNING UNIT
153 CALCULATION UNIT (MEASUREMENT UNIT)
154 PREDICTION UNIT
155 GENERATION UNIT (CONTROL UNIT)
156, 156A TRANSMISSION UNIT

The invention claimed is:

1. A bias adjustment device for an identification model by machine learning using training data, the bias adjustment device comprising:

processing circuitry configured to:

calculate first identification accuracy of the identification model trained on first training data for each of a plurality of defined bias categories and second identification accuracy of the identification model trained on second training data acquired by an adjustment of a number of pieces of data of the first training data for each of the plurality of defined bias categories;

predict a change in identification accuracy with respect to the number of pieces of the first training data on a basis of the first identification accuracy for each of the plurality of defined bias categories and the second identification accuracy for each of the plurality of defined bias categories;

determine a required number of pieces of data to achieve a predetermined target value based on the predicted change;

when the required number of pieces of data does not exceed a threshold, adjust a number of pieces of data used for training the identification model on a basis of the predicted change in the identification accuracy for each of the plurality of defined bias categories so that the predicted change in the identification accuracy becomes the predetermined target value;

when the required number of pieces of data does exceed the threshold, change a network structure of the identification model on the basis of the predicted change in the identification accuracy for each of the plurality of defined bias categories so that the predicted change in the identification accuracy becomes the predetermined target value; and train the identification model using the adjusted number of pieces of data or the changed identification model to generate an updated identification model.

2. The bias adjustment device according to claim 1, wherein the processing circuitry is configured to cause the predicted change in the identification accuracy to be displayed in a graph or text.

3. The bias adjustment device according to claim 1, wherein the first training data is at least data related to race, gender, an address, income, or educational background.

4. An information processing device comprising:

processing circuitry configured to:

acquire training data used for training of a model by machine learning;

generate accuracy information for each of a plurality of defined bias categories indicating accuracy of the model on a basis of first accuracy of a first model, which is the model trained on the training data, and second accuracy of a second model that is the model trained on adjusted data in which a number of pieces of data of the training data is adjusted according to each of the plurality of defined bias categories:

predict a change in accuracy with respect to the number of pieces of the training data on a basis of the accuracy information for each of the plurality of defined bias categories;

determine a required number of pieces of data to achieve a predetermined target value based on the predicted change;

when the required number of pieces of data does not exceed a threshold, adjust a number of pieces of data used for training the model on a basis of the predicted change in the accuracy for each of the plurality of defined bias categories so that the predicted change in the accuracy becomes the predetermined target value;

when the required number of pieces of data does exceed the threshold, change a network structure of the model on the basis of the predicted change in the accuracy for each of the plurality of defined bias categories so that the predicted change in the accuracy becomes the predetermined target value; and train the model using the adjusted number of pieces of data or the changed model to generate an updated model.

5. The information processing device according to claim 4, wherein the processing circuitry is configured to generate the accuracy information for each of the plurality of defined bias categories on a basis of the second model trained on the adjusted data in which the number of pieces of data is reduced from the training data.

6. The information processing device according to claim 4, wherein the processing circuitry is configured to generate, on a basis of the first accuracy and the second accuracy, the accuracy information for each of the plurality of defined bias categories indicating an accuracy change in the model due to the adjustment of the number of pieces of data according to each of the plurality of defined bias categories.

7. The information processing device according to claim 4, wherein the processing circuitry is configured to generate the accuracy information for each of the plurality of defined bias categories on a basis of the first accuracy of the first model, which accuracy is measured by utilization of evaluation data, and the second accuracy of the second model which accuracy is measured by utilization of the evaluation data.

8. The information processing device according to claim 4, wherein the processing circuitry is configured to generate, on a basis of the first accuracy and the second accuracy, the accuracy information for each of the plurality of defined bias categories indicating a prediction of an accuracy change in the model of a case where the number of pieces of data is adjusted according to each of the plurality of defined bias categories.

9. The information processing device according to claim 4, wherein the processing circuitry is configured to generate the accuracy information for each of the plurality of defined bias categories indicating a prediction of an accuracy change in the model of a case where the number of pieces of data of the training data is increased.

10. The information processing device according to claim 4, wherein the processing circuitry is configured to generate the accuracy information for each of the plurality of defined bias categories including a prediction line of the accuracy of the model of a case where the number of pieces of data of the training data is increased.

11. The information processing device according to claim 4, wherein the processing circuitry is configured to generate the accuracy information related to one of the plurality of defined bias categories on a basis of the second accuracy of the second model trained on the adjusted data in which the number of pieces of data of the training data is adjusted for the one of the plurality of defined bias categories.

12. The information processing device according to claim 11, wherein the processing circuitry is configured to generate, on a basis of the second accuracy of the second model trained on the adjusted data in which the number of pieces of data of the training data is adjusted according to the one of the plurality of defined bias categories, accuracy information of the model.

13. The information processing device according to claim 12, wherein the processing circuitry is configured to generate the accuracy information of the model on a basis of the second accuracy of the second model trained on the adjusted data in which only the number of pieces of data corresponding to the one of the plurality of defined bias categories in the training data is adjusted.

14. The information processing device according to claim 12, wherein the processing circuitry is configured to:

acquire the training data including data corresponding to each of the plurality of defined bias categories, and generate the accuracy information of the model on a basis of the second accuracy of the second model trained on the adjusted data in which the number of pieces of data corresponding to the one of the plurality of defined bias categories in the training data is reduced.

15. The information processing device according to claim 12, wherein the processing circuitry is configured to generate the accuracy information of the model on a basis of the first accuracy of the first model with respect to the one of the plurality of defined bias categories and the second accuracy of the second model with respect to the one of the plurality of defined bias categories.

16. The information processing device according to claim 15, wherein the processing circuitry is configured to generate the accuracy information of the model on a basis of the first accuracy of the first model which accuracy is measured by utilization of evaluation data corresponding to the one of the plurality of defined bias categories and the second accuracy of the second model which accuracy is measured by utilization of the evaluation data corresponding to the one of the plurality of defined bias categories.

17. The information processing device according to claim 12, wherein the processing circuitry is configured to generate the accuracy information indicating the accuracy of the model with respect to each of the plurality of defined bias categories on a basis of a plurality of pieces of the second accuracy of a plurality of second models respectively trained on a plurality of pieces of the adjusted data in which the number of pieces of data of the training data is adjusted for each of the plurality of defined bias categories.

18. The information processing device according to claim 4, wherein the processing circuitry is configured to cause the accuracy information to be displayed.

19. An information processing method comprising:

acquiring training data used for training of a model by machine learning, generating accuracy information for each of a plurality of defined bias categories indicating accuracy of the model on a basis of first accuracy of a first model, which is the model trained on the training data, and second accuracy of a second model that is the model trained on adjusted data in which a number of pieces of data of the training data is adjusted according to each of the plurality of defined bias categories, predicting a change in accuracy with respect to the number of pieces of the training data on a basis of the accuracy information for each of the plurality of defined bias categories, determining a required number of pieces of data to achieve a predetermined target value based on the predicted change, when the required number of pieces of data does not exceed a threshold, adjusting a number of pieces of data used for training the model on a basis of the predicted change in the accuracy for each of the plurality of defined bias categories so that the predicted change in the accuracy becomes the predetermined target value, when the required number of pieces of data does exceed the threshold, changing a network structure of the model on the basis of the predicted change in the accuracy for each of the plurality of defined bias categories so that the predicted change in the accuracy becomes the predetermined target value, and training the model using the adjusted number of pieces of data or the changed model to generate an updated model.

20. A non-transitory computer readable medium storing an information processing program including instructions that when executed by a computer causes the computer to perform a method, the method comprising:

acquiring training data used for training of a model by machine learning, generating accuracy information for each of a plurality of defined bias categories indicating accuracy of the model on a basis of first accuracy of a first model, which is the model trained on the training data, and second accuracy of a second model that is the model trained on adjusted data in which a number of pieces of data of the training data is adjusted according to each of the plurality of defined bias categories, predicting a change in accuracy with respect to the number of pieces of the training data on a basis of the accuracy information for each of the plurality of defined bias categories, determining a required number of pieces of data to achieve a predetermined target value based on the predicted change, when the required number of pieces of data does not exceed a threshold, adjusting a number of pieces of data used for training the model on a basis of the predicted change in the accuracy for each of the plurality of defined bias categories so that the predicted change in the accuracy becomes the predetermined target value, when the required number of pieces of data does exceed the threshold, changing a network structure of the model on the basis of the predicted change in the accuracy for each of the plurality of defined bias categories so that the predicted change in the accuracy becomes the predetermined target value, and training the model using the adjusted number of pieces of data or the changed model to generate an updated model.

* * * * *